(12) United States Patent
Yui et al.

(10) Patent No.: US 10,393,333 B2
(45) Date of Patent: Aug. 27, 2019

(54) DAYLIGHTING DEVICE AND DAYLIGHTING SYSTEM

(71) Applicant: SHARP KABUSHIKI KAISHA, Sakai, Osaka (JP)

(72) Inventors: Hideomi Yui, Sakai (JP); Tsuyoshi Kamada, Sakai (JP); Toru Kanno, Sakai (JP); Shun Ueki, Sakai (JP); Tomoko Ueki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/580,371

(22) PCT Filed: Jun. 9, 2016

(86) PCT No.: PCT/JP2016/067263
§ 371 (c)(1),
(2) Date: Dec. 7, 2017

(87) PCT Pub. No.: WO2016/199866
PCT Pub. Date: Dec. 15, 2016

(65) Prior Publication Data
US 2018/0163938 A1     Jun. 14, 2018

(30) Foreign Application Priority Data
Jun. 9, 2015   (JP) ................... 2015-116338

(51) Int. Cl.
*F21S 11/00* (2006.01)
*E06B 5/00* (2006.01)
(Continued)

(52) U.S. Cl.
CPC ................. *F21S 11/00* (2013.01); *E06B 3/66* (2013.01); *E06B 3/6722* (2013.01); *E06B 5/00* (2013.01);
(Continued)

(58) Field of Classification Search
CPC ...................................... F21S 11/007
See application file for complete search history.

(56) References Cited

U.S. PATENT DOCUMENTS

| | | | | |
|---|---|---|---|---|
| 4,993,469 | A * | 2/1991 | Moench | E06B 9/32 160/168.1 P |
| 8,893,434 | B1 * | 11/2014 | Konstantin | E06B 7/096 160/236 |
| 2012/0273023 | A1 * | 11/2012 | Ely | F24J 2/38 136/246 |
| 2014/0016191 | A1 | 1/2014 | Yeh et al. | |
| 2015/0153483 | A1 | 6/2015 | Endoh et al. | |

(Continued)

FOREIGN PATENT DOCUMENTS

| | | |
|---|---|---|
| DE | 1683284 A1 | 5/1970 |
| DE | 19537190 A1 * | 4/1997 ............... E06B 9/36 |

(Continued)

*Primary Examiner* — Christopher E Mahoney
(74) *Attorney, Agent, or Firm* — ScienBiziP, P.C.

(57) ABSTRACT

There is provided a daylighting device (10) installed to face window glass and including a daylighting member (40) having a light-transmissive base member and a plurality of light-transmissive daylighting units disposed adjacent to each other on at least one surface of the base member, and the daylighting member (40) includes a movable unit that moves such that the one surface of the base member follows a movement of the sun to turn toward an orientation of the sun.

2 Claims, 21 Drawing Sheets

(51) Int. Cl.
  *F21V 5/00* (2018.01)
  *F21V 5/02* (2006.01)
  *F21V 11/06* (2006.01)
  *G02B 5/00* (2006.01)
  *F24S 50/80* (2018.01)
  *E06B 3/66* (2006.01)
  *G02B 5/04* (2006.01)
  *E06B 3/67* (2006.01)
  *E06B 9/386* (2006.01)
  *E06B 9/24* (2006.01)
  *E06B 9/264* (2006.01)

(52) U.S. Cl.
  CPC ............... *F21S 11/007* (2013.01); *F21V 5/00* (2013.01); *F21V 5/02* (2013.01); *F21V 11/06* (2013.01); *F24S 50/80* (2018.05); *G02B 5/00* (2013.01); *G02B 5/04* (2013.01); *E06B 9/386* (2013.01); *E06B 2009/2417* (2013.01); *E06B 2009/2643* (2013.01)

(56) References Cited

U.S. PATENT DOCUMENTS

| | | | |
|---|---|---|---|
| 2015/0284990 A1* | 10/2015 | Hall | F16H 1/20 74/606 R |
| 2016/0238749 A1 | 8/2016 | Chou et al. | |
| 2017/0146207 A1* | 5/2017 | Nishinaka | F21S 11/007 |
| 2017/0204658 A1* | 7/2017 | Kin | E06B 9/322 |

FOREIGN PATENT DOCUMENTS

| | | | | |
|---|---|---|---|---|
| EP | 1542054 A1 | 6/2005 | | |
| EP | 2685045 A2 | 1/2014 | | |
| JP | 10-280840 A | 10/1998 | | |
| JP | 2006-037456 A | 2/2006 | | |
| JP | 2010-150883 A | 7/2010 | | |
| JP | 5123364 B2 | 1/2013 | | |
| JP | 2013-254130 A | 12/2013 | | |
| JP | WO 2014196596 A1 * | 12/2014 | | E06B 5/00 |
| TW | M500903 U | 5/2015 | | |
| WO | 2015/076245 A1 | 5/2015 | | |

\* cited by examiner

DAYLIGHTING DEVICE AND DAYLIGHTING SYSTEM

TECHNICAL FIELD

The present invention relates to a daylighting device and a daylighting system.

Priority is claimed based on Japanese Patent Application No. 2015-116338 filed in Japan on Jun. 9, 2015, the contents of which are incorporated herein by reference.

BACKGROUND ART

When lighting equipment is used not only at nighttime but during daytime to maintain indoor visual environment, the sunlight is not utilized sufficiently.

In the related art, as a technique for effectively guiding the sunlight incident on window glass indoors, for example, it is known that there is a daylighting device having a daylighting unit configured to have a photorefractive microstructure such as a lenticular, a linear prism, and a pyramid type prism, controlling an outgoing direction of the sunlight incident on the window glass indoors using the daylighting unit, and utilizing the sunlight as indoor lighting. As such a daylighting device, for example, there is a light guide microstructure plate which is capable of outputting light in a wide angle range in accordance with incident light having different angles by being reflected totally in a curved cylindrical surface structure after a part of incident luminous flux enters into a inclined cylindrical surface structure (for example, refer to PTL 1).

CITATION LIST

Patent Literature

PTL 1: Japanese Patent No. 5123364

SUMMARY OF INVENTION

Technical Problem

However, in the daylighting device of the related art, since an outgoing angle of the sunlight indoors is changed depending on an altitude and an orientation of the sun, it is impossible to stably take the light (daylighting) indoors. Accordingly, in the daylighting device of the related art, there is a case where an outgoing light to indoor ceiling is weak, or a person feels unpleasant glare due to light dispersed to eyes of the person indoors depending on the altitude and the orientation of the sun.

Several aspects of the present invention have been made in view of the above circumstances and provide a daylighting device and a daylighting system capable of stably taking daylight indoors and preventing a person indoors from feeling unpleasant glare even when an altitude and an orientation of the sun are changed.

Solution to Problem

A daylighting device according to one aspect of the present invention is installed so as to face window glass and includes a daylighting member including a light-transmissive base member and a plurality of light-transmissive daylighting units disposed adjacent to each other in at least one surface of the base member, and the daylighting member includes a movable unit that moves such that the one surface of the base member follows a movement of the sun to turn toward an orientation of the sun.

In the daylighting device according to one aspect of the present invention, it is preferable that the movable unit moves in a direction perpendicular to a vertical direction of the window glass.

In the daylighting device according to one aspect of the present invention, it is preferable that a plurality of the daylighting members are disposed continuously in a direction perpendicular to a vertical direction of the window glass.

In the daylighting device according to one aspect of the present invention, it is preferable that a shielding member hanging down from the daylighting member is included.

In the daylighting device according to one aspect of the present invention, it is preferable that when a width of the daylighting member is w, an orientation of the sun with respect to the daylighting member is $\phi$, and a distance between the daylighting members is l, $l=w+w \sin \phi \tan \phi$ is satisfied.

In the daylighting device according to one aspect of the present invention, it is preferable that when a distance between the daylighting members in a case where the daylighting members are disposed in parallel to the window glass is $l_1$ and a distance between the daylighting members in a case where the daylighting members are disposed obliquely with respect to the window glass is $l_2$, $l_1 < l_2$ is satisfied.

In the daylighting device according to one aspect of the present invention, it is preferable that the daylighting device is installed inside double-layered glass or multi-layered glass.

In the daylighting device according to one aspect of the present invention, it is preferable that a distance between pieces of glass configuring the double-layered glass or the multi-layered glass is larger than a width of the daylighting member.

In the daylighting device according to one aspect of the present invention, it is preferable that the daylighting unit is configured to have a plurality of quadrangular pyramid-shaped structures, the plurality of quadrangular pyramid-shaped structures are disposed continuously, and the structure has at least one change point in which a shape of the structure is changed.

A daylighting system according to one aspect of the present invention includes a daylighting device, an indoor lighting fixture, a measuring unit that measures indoor brightness, and a control unit that controls the indoor lighting fixture and the measuring unit, and the daylighting device is the daylighting device according to one aspect of the present invention.

Advantageous Effects of Invention

According to several aspects of the present invention, it is possible to provide a daylighting device and a daylighting system capable of stably taking daylight indoors and preventing a person indoors from feeling unpleasant glare even when an altitude and an orientation of the sun are changed.

DESCRIPTION OF EMBODIMENTS

Figure 1:
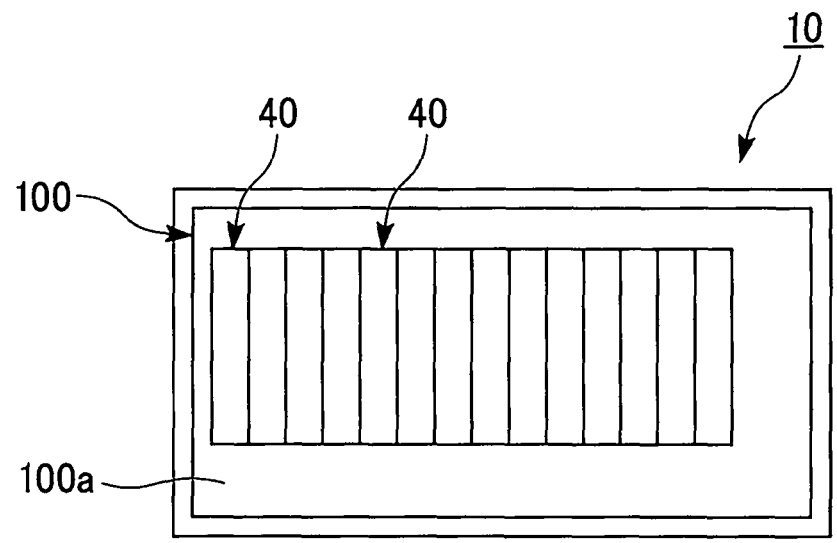
FIG. 1 is a front view illustrating a schematic configuration of a daylighting device according to a first embodiment of the present invention.

Embodiments of a daylighting device and a daylighting system of the present invention will be described.

The embodiments will be described in detail in order to better understand the gist of the present invention and do not limit the present invention unless otherwise specified.

In the drawings used in the following description, in order to make the features of the present invention easy to understand, there are cases where the main part is illustrated in an enlarged manner for convenience, but a dimensional ratio and the like of each component are not always the same as the actual ones.

First Embodiment (Daylighting Device)

Figure 2:
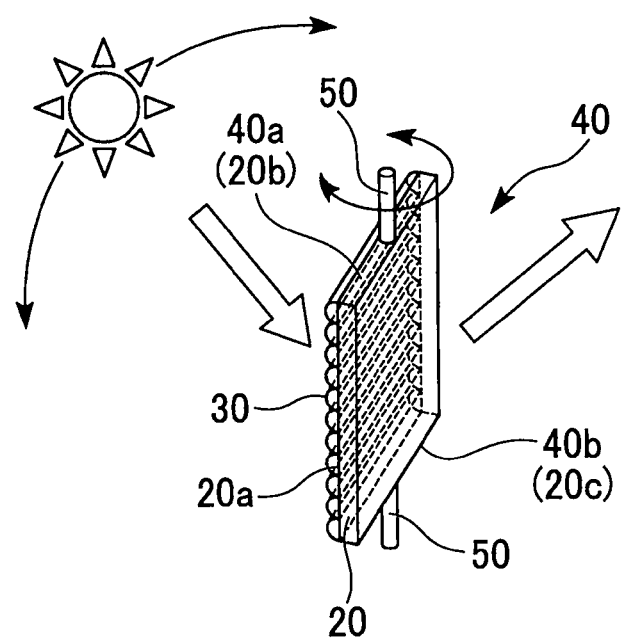
FIG. 2 is a perspective view illustrating a schematic configuration of a daylighting member configuring the daylighting device according to the first embodiment of the present invention.
Figure 3:
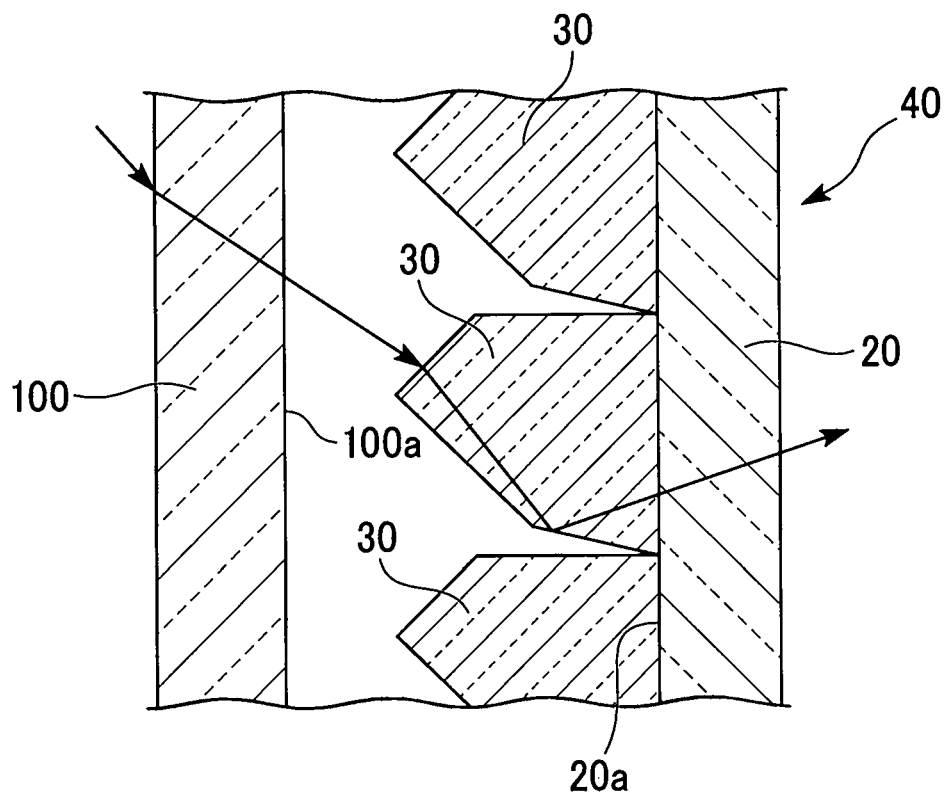
FIG. 3 is a sectional view illustrating the schematic configuration of the daylighting member configuring the daylighting device according to the first embodiment of the present invention.
Figure 4:
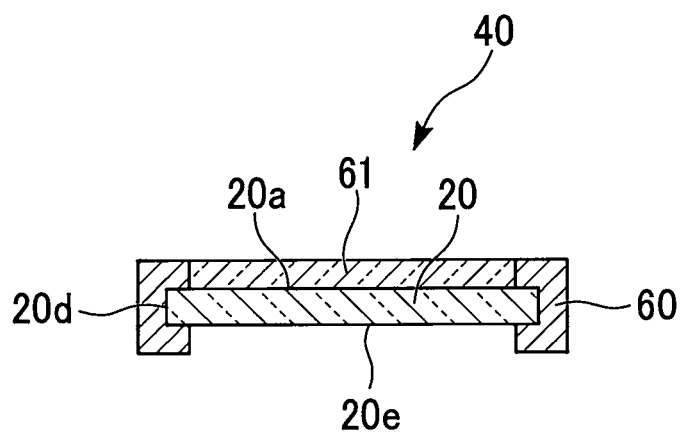
FIG. 4 is a sectional view illustrating the schematic configuration of the daylighting member configuring the daylighting device according to the first embodiment of the present invention.

FIG. 1 is a front view illustrating a schematic configuration of a daylighting device according to a first embodiment of the present invention. FIG. 2 is a perspective view illustrating a schematic configuration of a daylighting member configuring the daylighting device according to the first embodiment of the present invention. FIG. 3 is a sectional view illustrating the schematic configuration of the daylighting member configuring the daylighting device according to the first embodiment of the present invention. FIG. 4 is a sectional view illustrating the schematic configuration of the daylighting member configuring the daylighting device according to the first embodiment of the present invention.

As illustrated in FIG. 1, a daylighting device 10 of the embodiment is installed to face an indoor side surface (hereinafter referred to as "one surface") 100a of a window glass 100. As illustrated in FIG. 2, the daylighting device 10 of the embodiment includes a daylighting member 40 having a light-transmissive base member 20 and a plurality of light-transmissive daylighting units 30 disposed adjacent to each other on one surface (light incident surface, surface facing outdoor side) 20a of the base member 20.

In the daylighting device 10 of the embodiment, as illustrated in FIG. 1, the daylighting member 40 has a stripe shape along the vertical direction (height direction) of the window glass 100. In the daylighting device 10 of the embodiment, as illustrated in FIG. 1, a plurality of the daylighting members 40 are disposed continuously in a direction perpendicular to the vertical direction of the window glass 100. The adjacent daylighting members 40 are disposed such that a part of edges of the daylighting members along the longitudinal direction thereof overlaps each other.

As illustrated in FIG. 3, the daylighting unit 30 of the daylighting member 40 is disposed on the one surface 20a of the base member 20 such that the longitudinal direction thereof is, for example, extended in the direction perpendicular to the vertical direction of the window glass 100 in which the daylighting device 10 is installed, that is, a direction perpendicular to the longitudinal direction of the base member 20. In the daylighting unit 30, a shape of a section perpendicular to the longitudinal direction thereof is a polygonal (pentagonal or more) shape.

Thereby, as illustrated in FIG. 3, when the sunlight transmitted through the window glass 100 is incident on the daylighting unit 30, the sunlight is reflected inside the daylighting unit 30, and the reflected sunlight is output toward one end (upper end) side of the base member 20, that is, an indoor ceiling side from the base member 20.

As illustrated in FIG. 2, the daylighting member 40 includes a movable unit 50 that moves such that the one surface 20a of the base member 20 follows the movement of the sun to turn toward an orientation of the sun. As illustrated in FIG. 2, the movable units 50 are configured to have columnar members and disposed respectively in the one end (upper end) 40a (the one end (upper end) 20b of the base member 20) of the longitudinal direction of the daylighting member 40 having the stripe shape and in the other end (lower end) 40b (the other end (lower end) 20c of the base member 20) of the longitudinal direction of the daylighting member 40 having the stripe shape. The movable unit 50 is disposed on the center line along the longitudinal direction of the base member 20. That is, the movable unit 50 forms the central axis of the daylighting member 40. The movable unit 50 is configured to move (rotate) in the direction perpendicular to the vertical direction of the window glass 100. Thereby, the daylighting member 40 is configured to move (rotate) in the direction perpendicular to the vertical direction of the window glass 100 with the movable unit 50 as the center.

As illustrated in FIG. 4, the daylighting member 40 may be supported by a support frame 60 from the outside. The support frame 60 has a light-transmitting unit 61 configured to have the same light-transmissive material as the base member 20 at a part facing the one surface 20a (surface in which the daylighting unit 30 is disposed) of the base member 20. In FIG. 4, the daylighting unit 30 is omitted. In a case where the daylighting member 40 is supported by the support frame 60, the movable unit 50 may be disposed on the support frame 60. In the case, the movable unit 50 is disposed respectively in the one end (upper end) of the longitudinal direction of the support frame 60 and the other end (lower end) of the longitudinal direction of the support frame 60. The movable unit 50 is disposed on the center line along the longitudinal direction of the support frame 60. That is, the movable unit 50 forms the central axis of the support frame 60.

As illustrated in FIG. 4, the support frame 60 faces the entire surface of the one surface 20a (surface in which the daylighting unit 30 is disposed) side of the base member 20 and the side surface 20d of the base member 20, and a shape of a section perpendicular to the longitudinal direction thereof is U-shaped so as to face the other surface 20e (surface in which the daylighting unit 30 is not disposed) of the base member 20. A material of a part of the support frame 60 other than the light-transmitting unit 61 is not limited particularly as long as it has strength capable of supporting the daylighting member 40.

The base member 20 is not limited particularly as long as it has light transmissivity and examples of the base member include a film (base member) and a substrate configured to have the light-transmissive material such as triacetylcellulose (TAC), polyethylene terephthalate (PET), cycloolefin polymer (COP), polycarbonate (PC), polyethylene naphthalate (PEN), polyethersulfone (PES), or polymide (PI).

An ultraviolet absorber or an infrared absorber may be included in the base member 20 as long as the light transmissivity and the flexibility are not impaired.

Various designs may be employed in the base member 20 as long as the light transmissivity and the flexibility are not impaired.

A thickness of the base member 20 is not limited particularly and adjusted appropriately according to strength or the light transmissivity required for the daylighting member 40.

A material configuring the daylighting unit 30 is not limited particularly as long as it has the light transmissivity and, for example, the same material configuring the base member 20 is used.

The daylighting unit 30 is formed on the one surface 20a of the base member 20 by a method such as a thermal imprinting method, an ultraviolet imprinting method, a heat press method, injection molding, extrusion molding, or compression molding.

According to the daylighting device 10 of the embodiment, since the daylighting member 40 having the base member 20 and the plurality of daylighting units 30 disposed adjacent to each other on the one surface 20a of the base member 20 is included and the daylighting member 40 includes the movable unit 50 that moves such that the one surface 20a of the base member 20 follows the movement of the sun to turn toward the orientation of the sun, even when the orientation of the sun is changed, it is possible to effectively output the sunlight incident on the window glass 100 indoors, particularly toward the ceiling. Thereby, it is possible to use the sunlight as indoor lighting during daytime. It is possible to prevent a person indoors from feeling unpleasant glare due to light dispersed to eyes of the person.

Figure 5A:
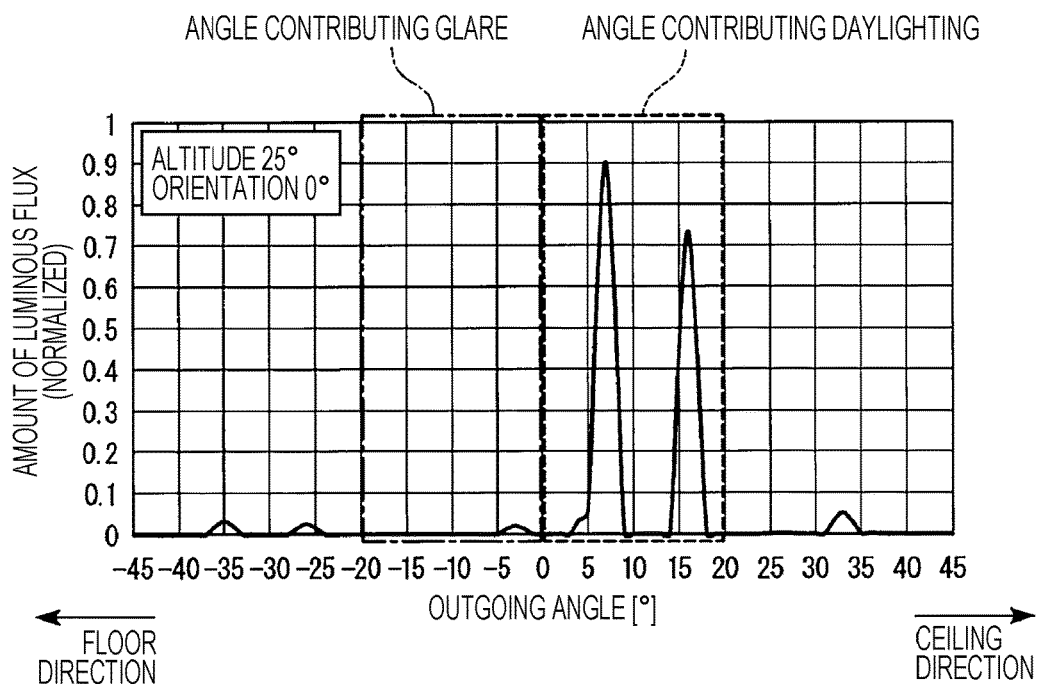
FIG. 5A is a diagram illustrating a relationship between an angle formed by the daylighting device according to the first embodiment of the present invention and an orientation of the sun and an angle (outgoing angle) at which the sunlight incident on the daylighting member is output indoors.
Figure 5B:
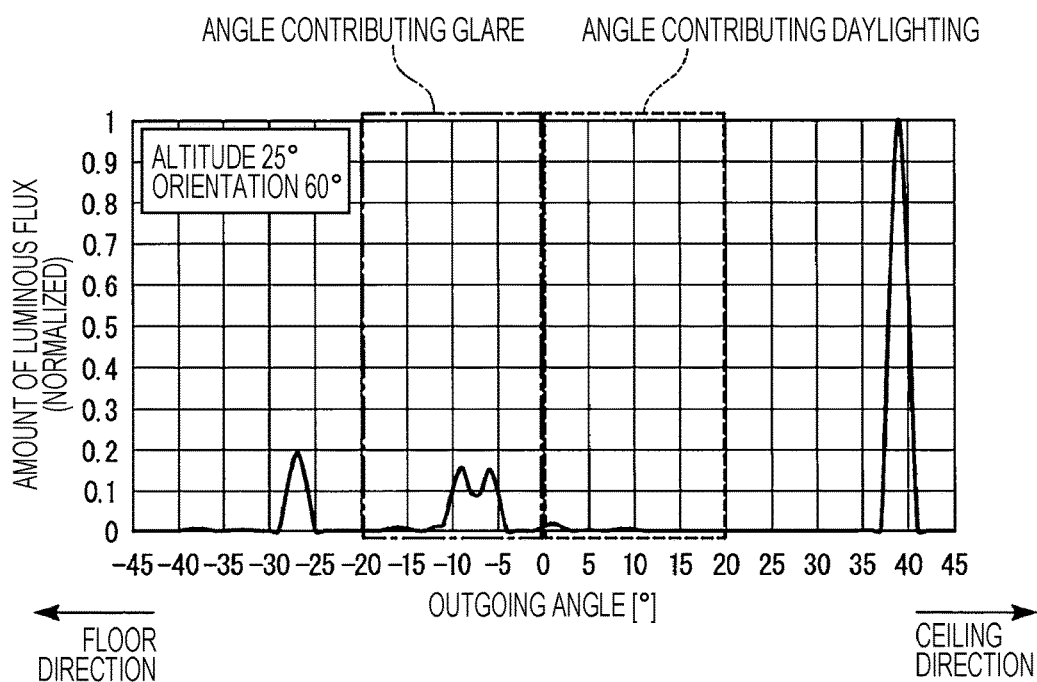
FIG. 5B is a diagram illustrating a relationship between an angle formed by the daylighting device according to the first embodiment of the present invention and an orientation of the sun and an angle (outgoing angle) at which the sunlight incident on the daylighting member is output indoors.

Here, in a case where an altitude of the sun is 25° and the orientation of the sun with respect to the one surface 20a of the base member 20 is 0°, and in a case where the altitude of the sun is 25° and the orientation of the sun with respect to the one surface 20a of the base member 20 is 60°, an orientation of light (outgoing angle of light with respect to a surface (indoor side surface) opposite to the one surface 20a of the base member 20) output from the daylighting unit 30 of the daylighting member 40 will be described with reference to FIGS. 5A and 5B. In the embodiment, the one end (upper end) 40a of the longitudinal direction of the daylighting member 40 (one end (upper end) 20b of the base member 20) side, that is, the indoor ceiling side is set to an angle of "+". On the other hand, the other end (lower end)

40b of the longitudinal direction of the daylighting member 40 (the other end (lower end) 20c of the base member 20) side, that is, the indoor floor side is set to an angle of "−".

As illustrated in FIG. 5A, in a case where the altitude of the sun is 25° and the orientation of the sun with respect to the one surface 20a of the base member 20 is 0°, that is, the orientation of the sun and the one surface 20a of the base member 20 directly face each other, the outgoing angle of light output toward the indoor ceiling side from the daylighting unit 30 is about +5° to about +18°. Incidentally, when the sunlight is output toward the indoor ceiling side by the daylighting member 40, the outgoing angle of light that can be used as the lighting is 00 to +20°. As a result, in the case where the sun and the one surface 20a of the base member 20 directly face each other, the sunlight incident on the window glass 100 is output effectively toward the entire indoor ceiling, so that the sunlight can be used as the indoor lighting.

On the other hand, as illustrated in FIG. 5A, the outgoing angle of light output toward the indoor floor side from the daylighting unit 30 is about −24° to about −37°. That is, the daylighting unit 30 outputs the sunlight toward the floor side near the window glass 100. Incidentally, when the sunlight is output toward the indoor floor side by the daylighting member 40, the outgoing angle of light in which the person indoors feels unpleasant glare is 0° to −20°. As a result, in the case where the sun and the one surface 20a of the base member 20 directly face each other, it is possible to prevent the person indoors from feeling unpleasant glare by outputting the sunlight incident on the window glass 100 effectively toward the indoor floor side.

As illustrated in FIG. 5B, in a case where the altitude of the sun is 25° and the orientation of the sun with respect to the one surface 20a of the base member 20 is 60°, that is, the angle formed by the orientation of the sun and the one surface 20a of the base member 20 is 60°, the outgoing angle of light output from the daylighting unit 30 is about +35° to about +42°. As a result, in the case where the angle formed by the orientation of the sun and the one surface 20a of the base member 20 is 60°, the sunlight incident on the window glass 100 is output toward the ceiling side near the window glass 100. Accordingly, the sunlight incident on the window glass 100 is output only toward a region near the window glass 100 of the indoor ceiling, so that the sunlight cannot be used as the indoor lighting.

On the other hand, as illustrated in FIG. 5B, the outgoing angle of light output toward the indoor floor side from the daylighting unit 30 is about −4° to about −12°. That is, the sunlight is output toward the floor side near the window glass 100. As a result, in the case where the angle formed by the orientation of the sun and the one surface 20a of the base member 20 is 60°, the person indoors feels unpleasant glare due to the sunlight incident on the window glass 100.

Therefore, even when the orientation of the sun is changed, it is possible to effectively output the sunlight incident on the window glass 100 toward the indoor ceiling by moving the daylighting member 40 such that the one surface 20a of the base member 20 follows the movement of the sun to directly turn toward the orientation of the sun. It is possible to prevent the person indoors from feeling unpleasant glare.

Second Embodiment (Daylighting Device)

Figure 6A:
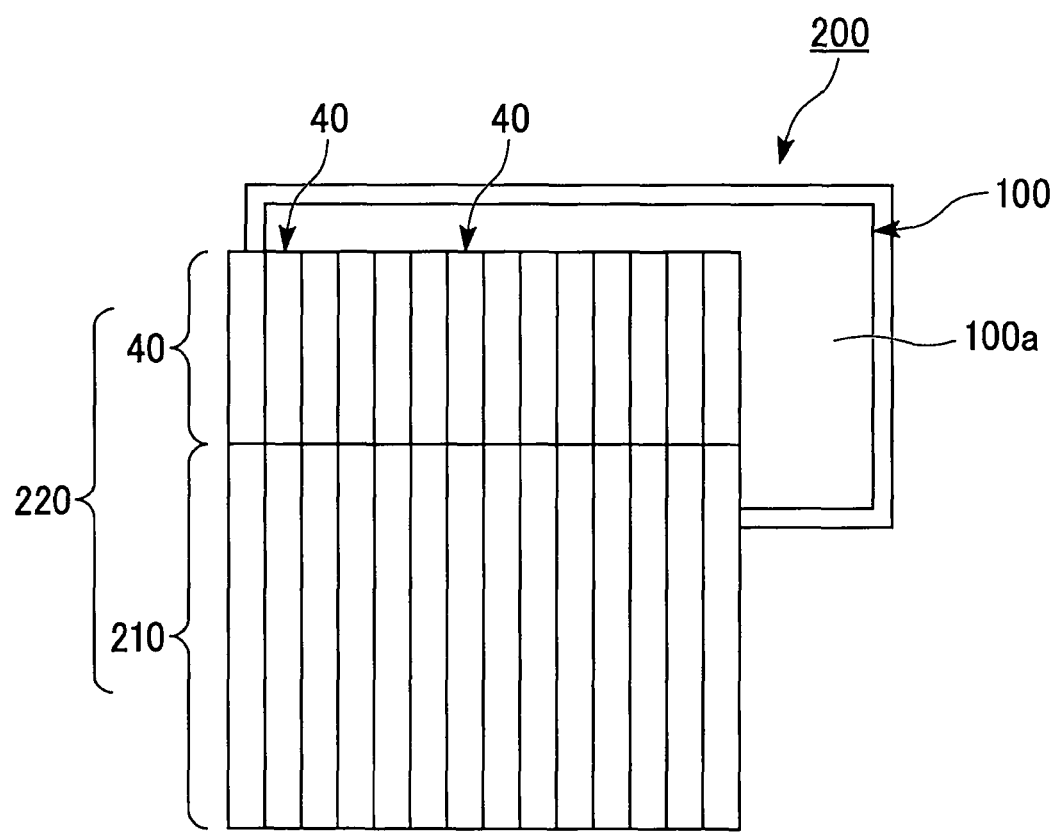
FIG. 6A is a front view illustrating a schematic configuration of a daylighting device according to a second embodiment of the present invention.
Figure 6B:
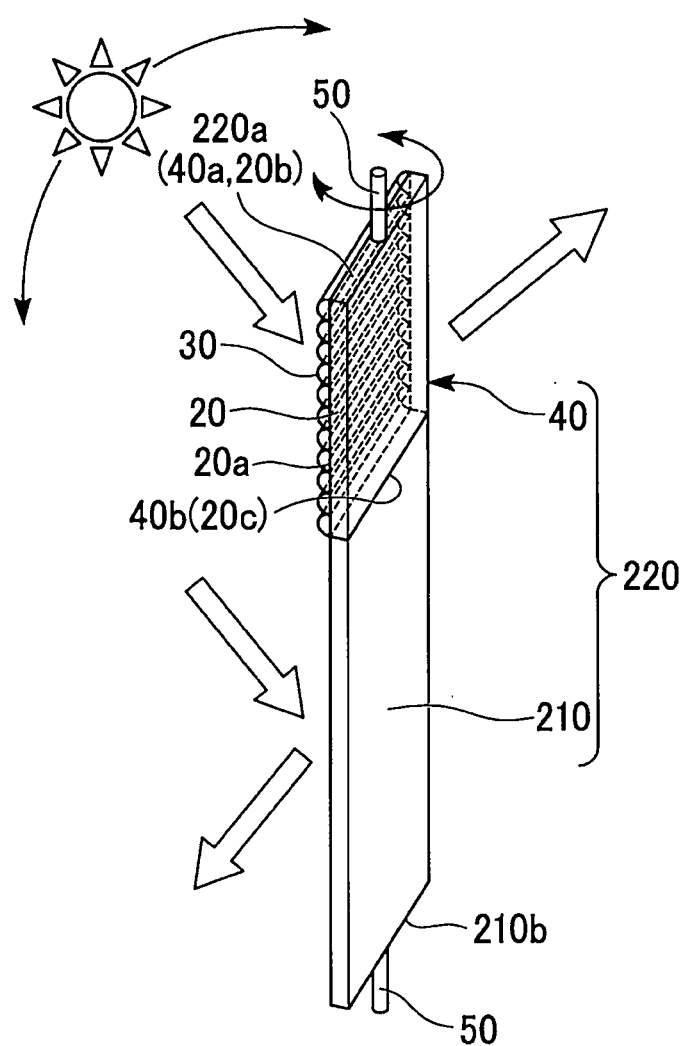
FIG. 6B is a perspective view illustrating the schematic configuration of the daylighting device according to the second embodiment of the present invention.

FIGS. 6A and 6B illustrate schematic configurations of a daylighting device according to a second embodiment of the present invention. FIG. 6A is a front view, and FIG. 6B is a perspective view. In FIGS. 6A and 6B, the same reference sign is assigned to the same component as the daylighting device of the first embodiment illustrated in FIGS. 1 and 2, and the description thereof is omitted.

A daylighting device 200 of the embodiment includes a shielding member 210 hanging down from each of the daylighting members 40 configuring the daylighting device 10 of the first embodiment.

As illustrated in FIG. 6A, in the daylighting device 200 of the embodiment, a composite member 220 configured to have the daylighting member 40 and the shielding member 210 hanging down from the daylighting member has a stripe shape along the vertical direction (height direction) of the window glass 100. As illustrated in FIG. 6A, in the daylighting device 200 of the embodiment, a plurality of the composite members 220 are disposed continuously in a direction perpendicular to the vertical direction of the window glass 100. The adjacent composite members 220 are disposed such that a part of edges of the composite members along the longitudinal direction thereof overlaps each other.

The shielding member 210 is a member having the stripe shape which is disposed continuously in the other end (lower end) 40b (the other end (lower end) 20c of the base member 20) of the longitudinal direction of the daylighting member 40 having the stripe shape. A width of the shielding member 210 is substantially the same as a width of the daylighting member 40.

Figure 7:
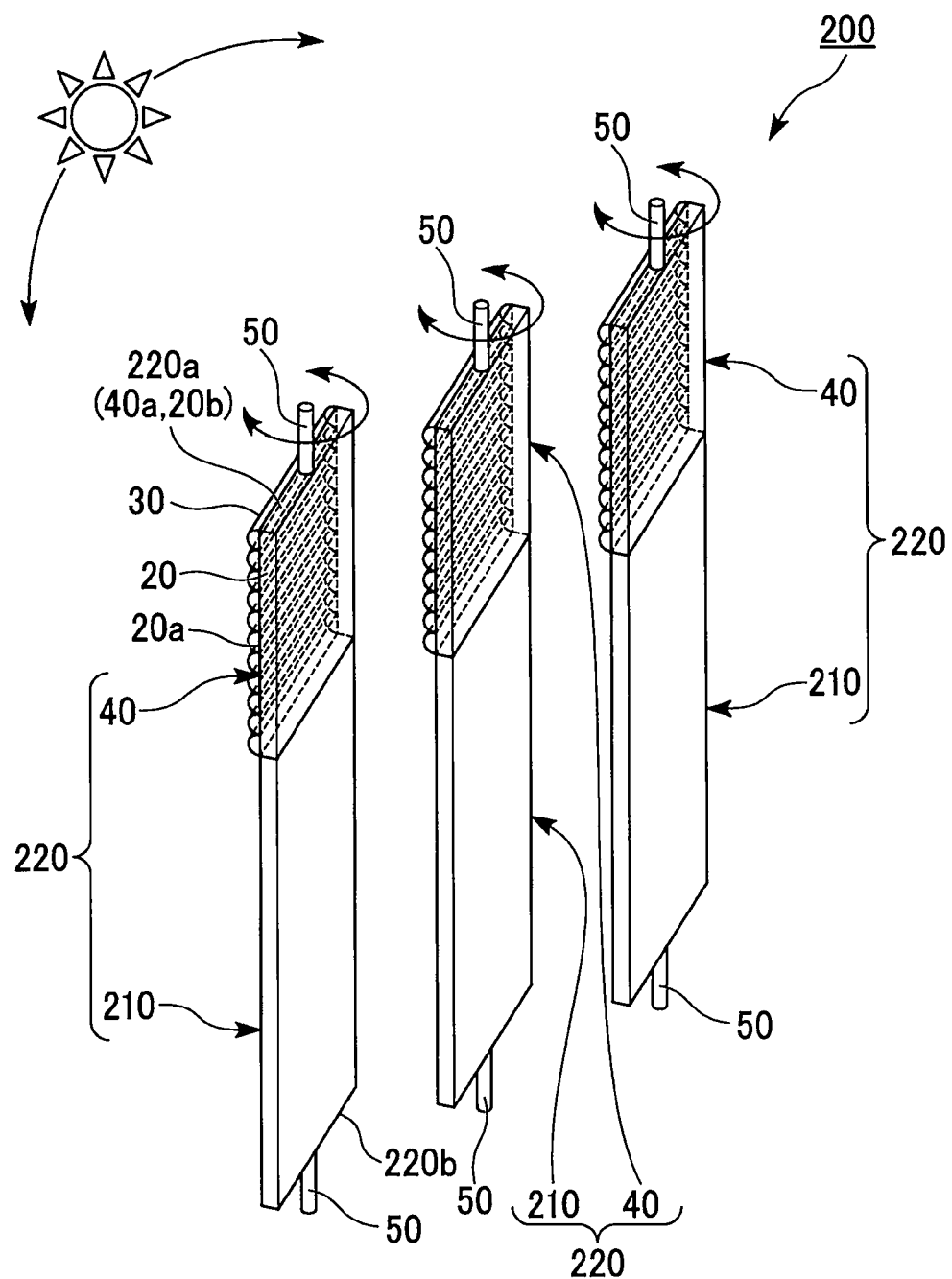
FIG. 7 is a perspective view illustrating a schematic configuration of a daylighting device according to the second embodiment of the present invention.

As illustrated in FIGS. 6B and 7, in the daylighting device 200 of the embodiment, the composite member 220 includes the movable unit 50 that moves such that the one surface 20a of the base member 20 of the daylighting member 40 configuring the composite member follows the movement of the sun to turn toward the orientation of the sun.

As illustrated in FIGS. 6B and 7, the movable units 50 are disposed respectively in the one end (upper end) 220a (the one end (upper end) 40a of the longitudinal direction of the daylighting member 40, the one end (upper end) 20b of the base member 20) of the longitudinal direction of the composite member 220 having the stripe shape and in the other end (lower end) 220b of the longitudinal direction of the composite member 220 having the stripe shape. The movable unit 50 is disposed on the center line along the longitudinal direction of the composite member 220. That is, the movable unit 50 forms the central axis of the daylighting member 40 and the shielding member 210. The movable unit 50 is configured to move (rotate) in the direction perpendicular to the vertical direction of the window glass 100. Thereby, the composite member 220 is configured to move (rotate) in the direction perpendicular to the vertical direction of the window glass 100 with the movable unit 50 as the center.

The shielding member 210 is configured to have a film (base member) or the like made of the light non-transmissive material.

As the light non-transmissive material, for example, a film (base member) obtained by adding a pigment to a light-transmissive resin such as triacetylcellulose (TAC), polyethylene terephthalate (PET), cycloolefin polymer (COP), polycarbonate (PC), polyethylene naphthalate (PEN), polyethersulfone (PES), or polymide (PI) and by forming the resin into a predetermined shape, or an aluminum foil which does not transmit light is used.

According to the daylighting device 200 of the embodiment, since the composite member 220 configured to have the daylighting member 40 and the shielding member 210 hanging down from the daylighting member 40 is included and the composite member 220 includes the movable unit 50 that moves such that the one surface 20a of the base member 20 follows the movement of the sun to turn toward the orientation of the sun, even when the orientation of the sun is changed, it is possible to effectively output the sunlight incident on the window glass 100 indoors, particularly toward the ceiling. Thereby, it is possible to use the sunlight as the indoor lighting during daytime. It is possible to prevent the person indoors from feeling unpleasant glare due to the light dispersed to eyes of the person. Further, since the daylighting device 200 includes the shielding member 210 hanging down from the daylighting member 40, an effect of preventing the light which makes the person indoors feel unpleasant glare from entering indoors is more excellent.

Figure 8:
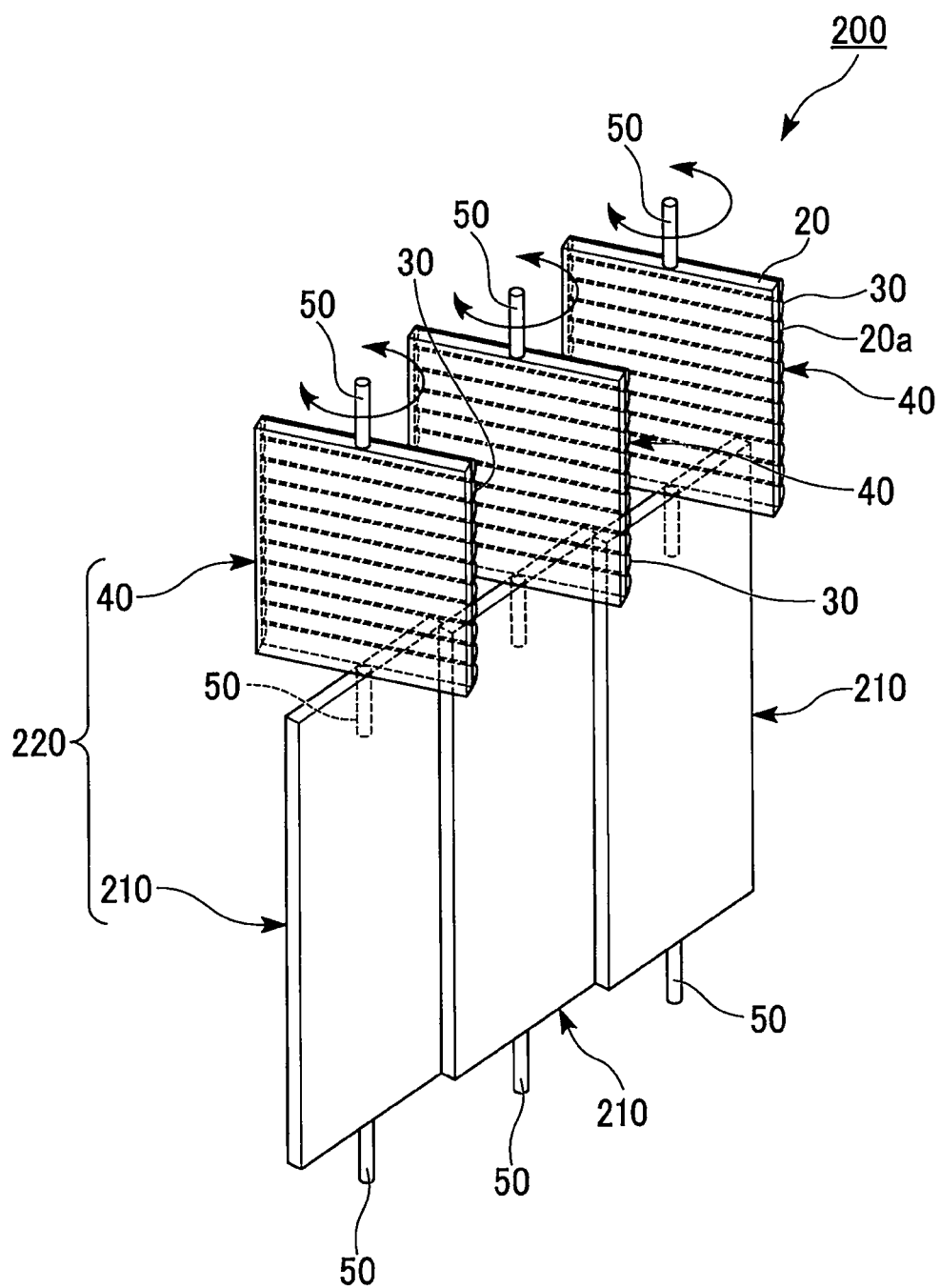
FIG. 8 is a perspective view illustrating the schematic configuration of the daylighting device according to the second embodiment of the present invention.

As illustrated in FIG. 8, in the daylighting device 200 of the embodiment, only the daylighting member 40 configuring the composite member 220 may include the movable unit 50 that moves such that the one surface 20a of the base member 20 follows the movement of the sun to turn toward the orientation of the sun. Thereby, even when the orientation of the sun is changed, it is possible to effectively output the sunlight incident on the window glass 100 indoors, particularly toward the ceiling and to use the sunlight as the indoor lighting during daytime. It is possible to prevent the person indoors from feeling unpleasant glare due to the light dispersed to eyes of the person. Further, in the example illustrated in FIG. 8, the shielding member 210 is disposed always along the one surface 100a of the window glass 100.

Accordingly, the effect of preventing the light which makes the person indoors feel unpleasant glare from entering indoors is more excellent.

Figure 9:
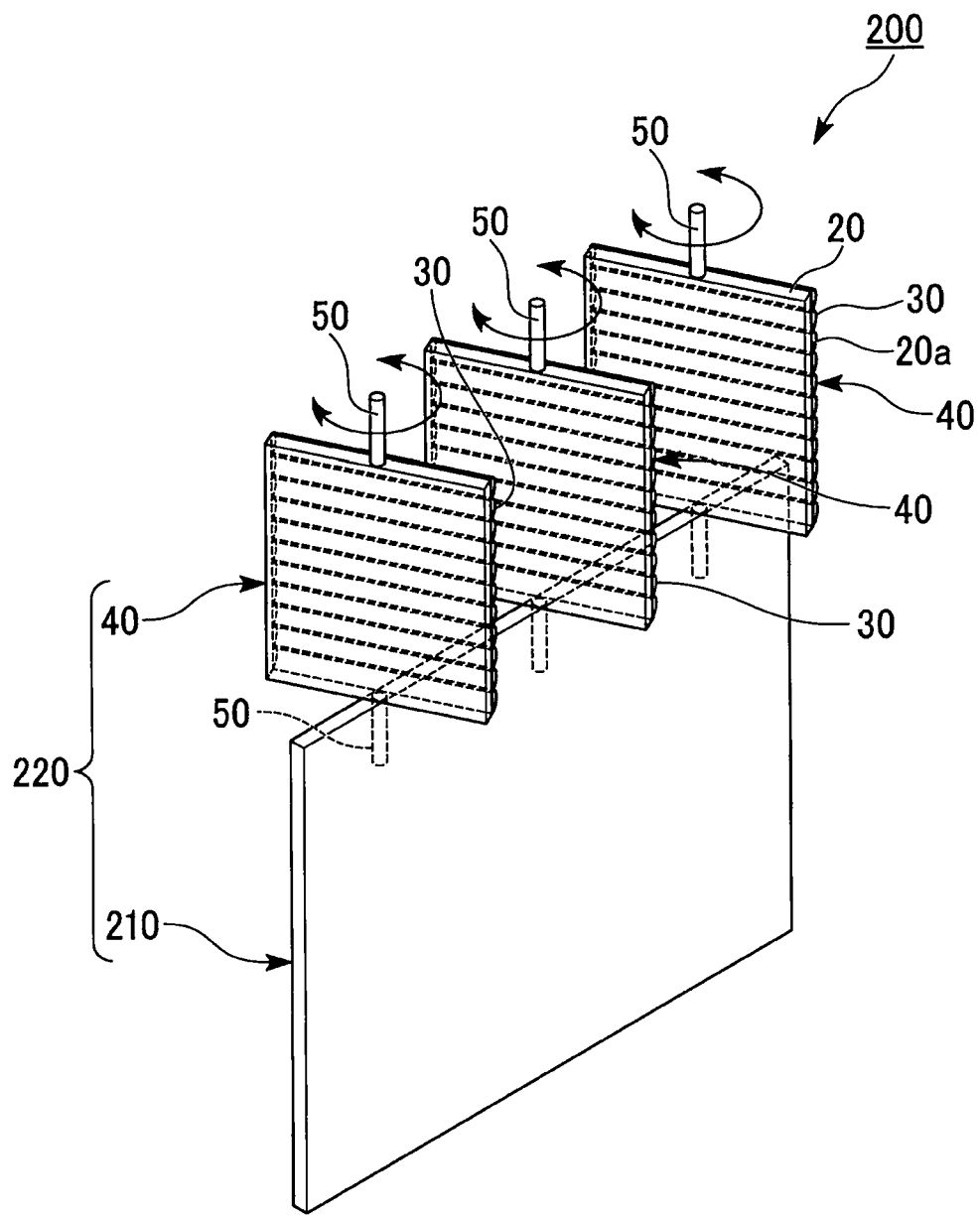
FIG. 9 is a perspective view illustrating the schematic configuration of the daylighting device according to the second embodiment of the present invention.

As illustrated in FIG. 9, in the daylighting device 200 of the embodiment, only the daylighting member 40 configuring the composite member 220 may include the movable unit 50 that moves such that the one surface 20a of the base member 20 follows the movement of the sun to turn toward the orientation of the sun. Thereby, even when the orientation of the sun is changed, it is possible to effectively output the sunlight incident on the window glass 100 indoors, particularly toward the ceiling and to use the sunlight as the indoor lighting during daytime. It is possible to prevent the person indoors from feeling unpleasant glare due to the light dispersed to eyes of the person. Further, in the example illustrated in FIG. 9, one shielding member 210 is hanging down from the plurality of the daylighting members 40, and the shielding member 210 is disposed always along the one surface 100a of the window glass 100. Accordingly, since a gap generated between respective shielding members 210 does not exist as in the case where the shielding member 210 having the same width as the daylighting member 40 is hanging down from each of the plurality of the daylighting members 40, the effect of preventing the light which makes the person indoors feel unpleasant glare from entering indoors is more excellent.

Third Embodiment (Daylighting Device)

Figure 10A:
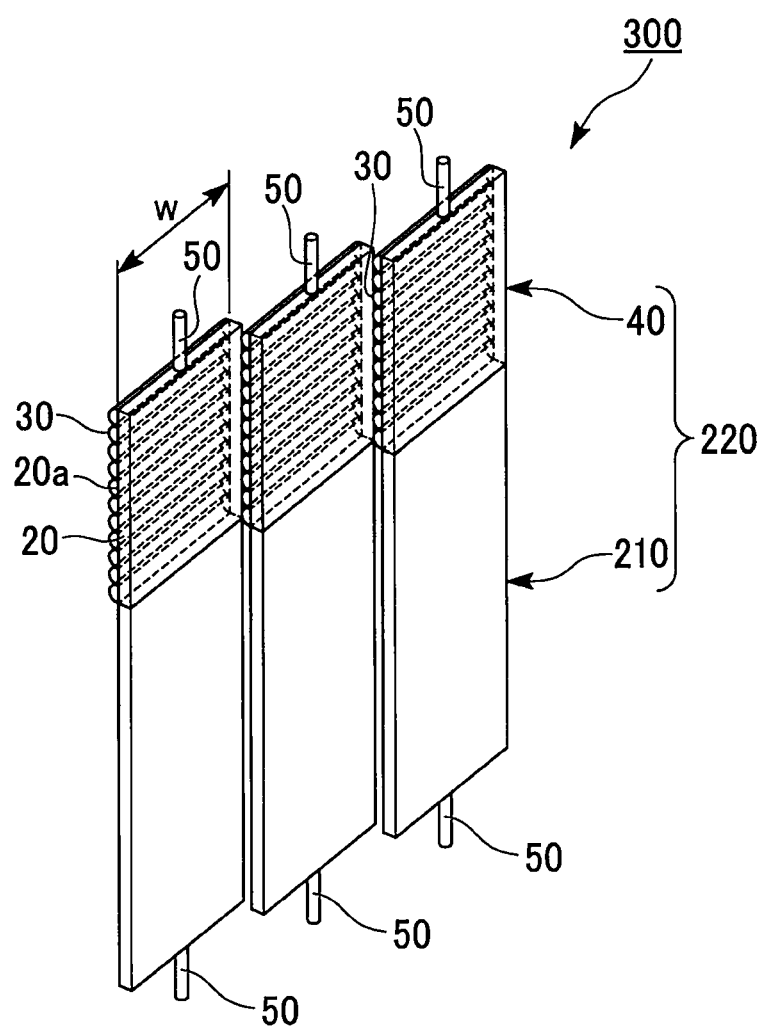
FIG. 10A is a perspective view illustrating a schematic configuration of a daylighting device according to a third embodiment of the present invention.
Figure 10B:
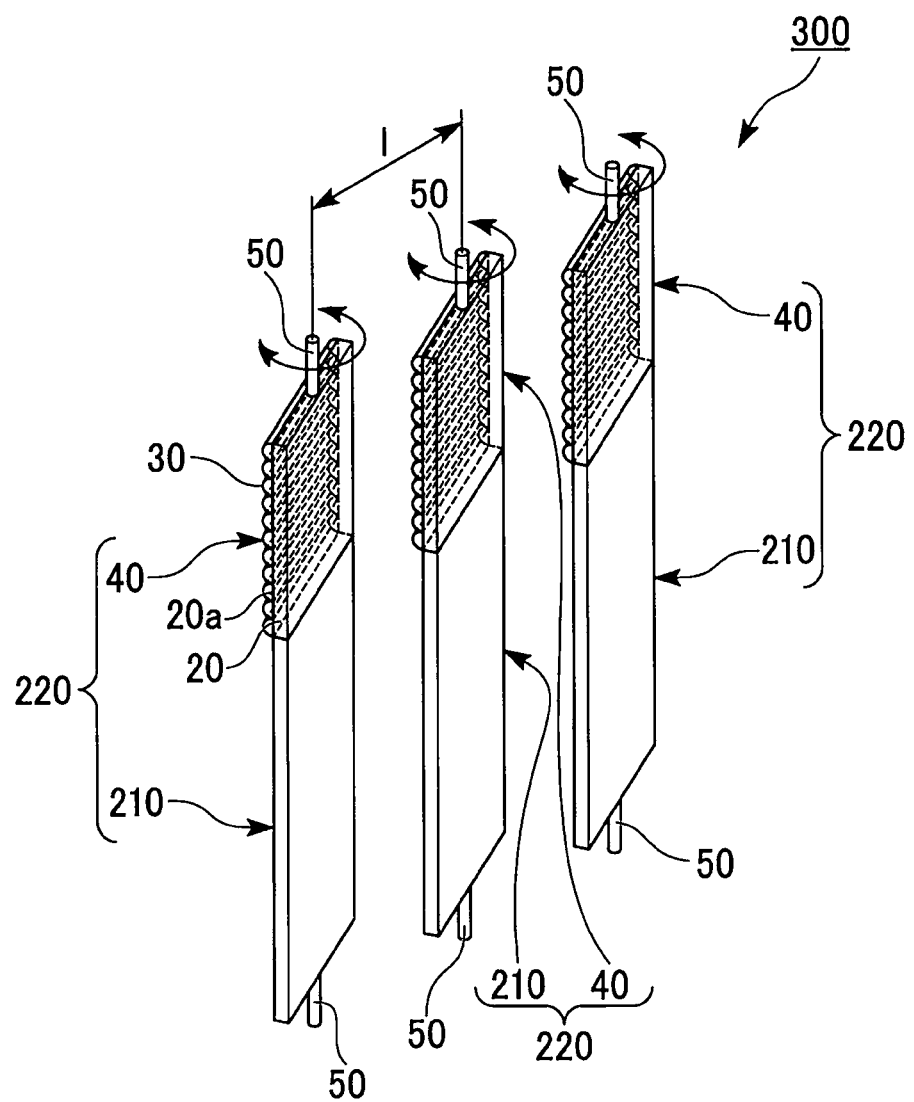
FIG. 10B is a perspective view illustrating the schematic configuration of the daylighting device according to the third embodiment of the present invention.
Figure 11A:
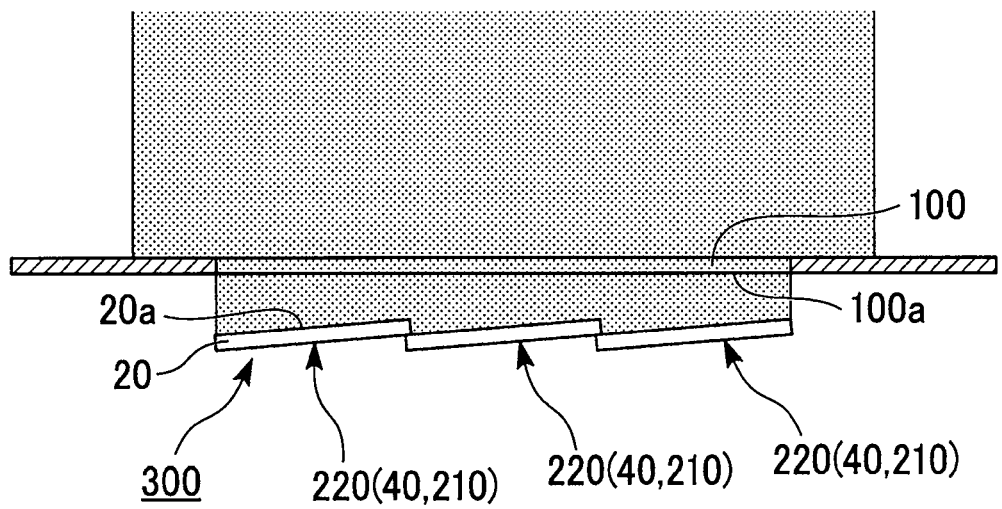
FIG. 11A is a top view illustrating the schematic configuration of the daylighting device according to the third embodiment of the present invention.
Figure 11B:
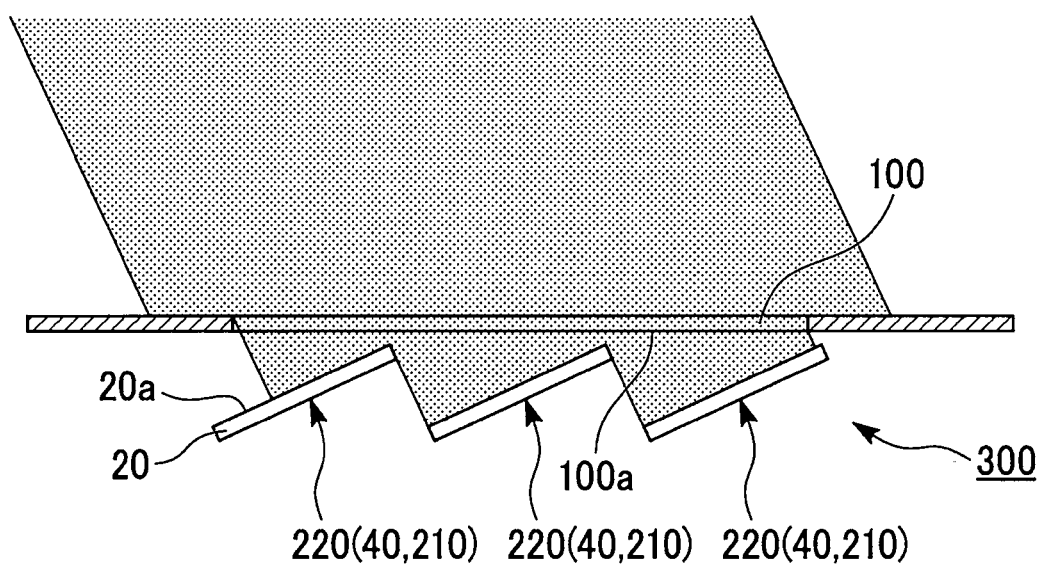
FIG. 11B is a top view illustrating the schematic configuration of the daylighting device according to the third embodiment of the present invention.
Figure 12A:
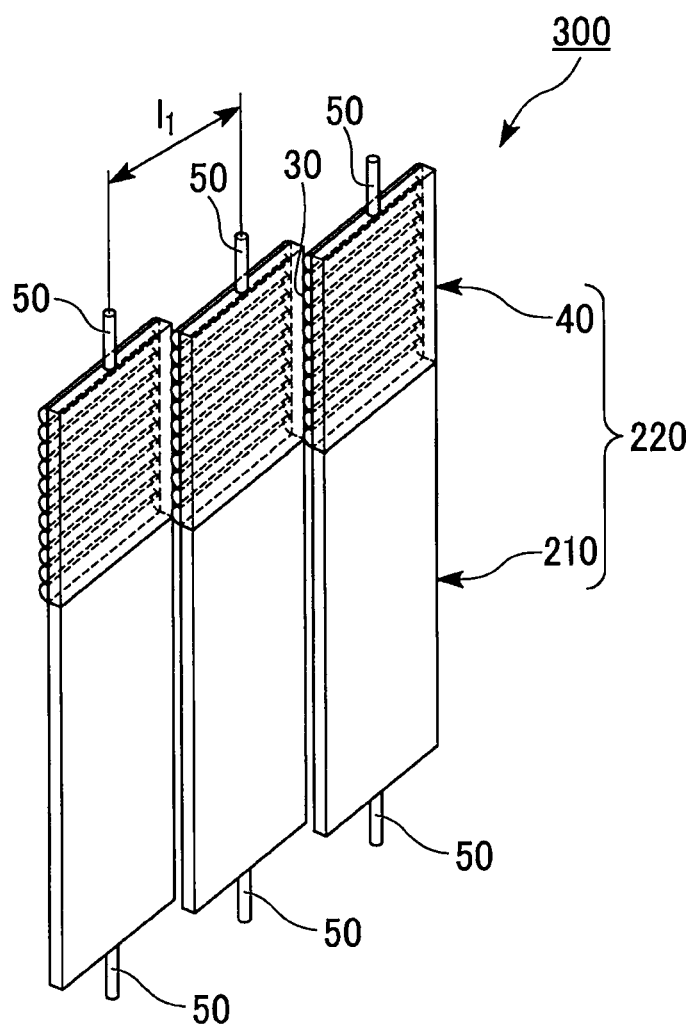
FIG. 12A is a perspective view illustrating the schematic configuration of the daylighting device according to the third embodiment of the present invention.
Figure 12B:
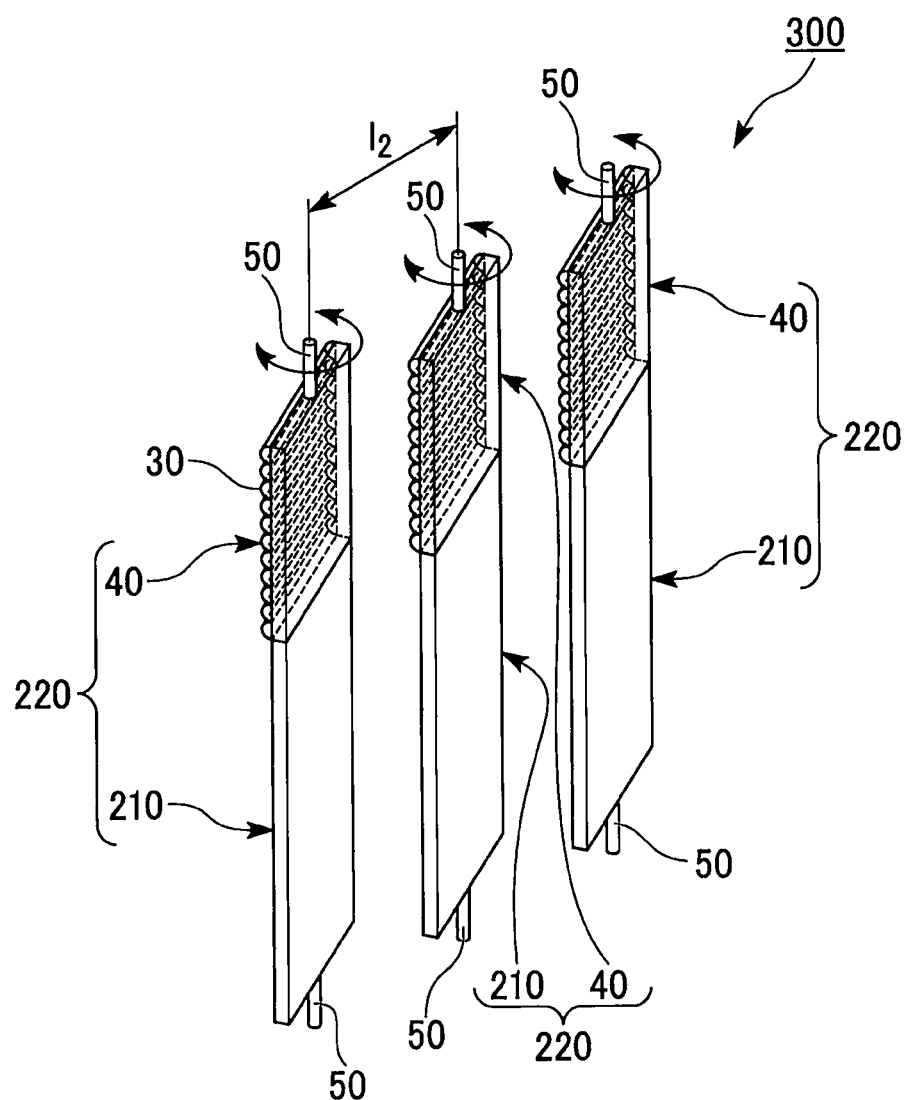
FIG. 12B is a perspective view illustrating the schematic configuration of the daylighting device according to the third embodiment of the present invention.

FIGS. 10A and 10B illustrate schematic configurations of a daylighting device according to a third embodiment of the present invention. FIG. 10A is a perspective view, and FIG. 10B is a perspective view. FIGS. 11A and 11B illustrate schematic configurations of the daylighting device according to the third embodiment of the present invention. FIG. 11A is a top view, and FIG. 11B is a top view. FIGS. 12A and 12B illustrate schematic configurations of the daylighting device according to the third embodiment of the present invention. FIG. 12A is a perspective view, and FIG. 12B is a perspective view. In FIGS. 10A to 12B, the same reference sign is assigned to the same component as the daylighting device of the first embodiment illustrated in FIGS. 1 and 2, the daylighting device of the second embodiment illustrated in FIGS. 6A, 6B, and 7, and the description thereof is omitted.

The daylighting device 300 of the embodiment includes the shielding member 210 hanging down from each of the daylighting members 40 configuring the daylighting device 10 of the first embodiment described above. As illustrated in FIGS. 10A and 11A, in the daylighting device 300 of the embodiment, a plurality of the daylighting members 40 are disposed continuously in a direction perpendicular to the vertical direction of the window glass 100. The adjacent daylighting members 40 are disposed such that a part of edges of the daylighting members along the longitudinal direction thereof overlaps each other.

As illustrated in FIG. 10A, in the daylighting device 300 of the embodiment, when the width of the daylighting member 40 configuring the composite member 220, that is, a length of a direction perpendicular to the longitudinal direction of the daylighting member 40 is w, the orientation of the sun with respect to the daylighting member 40, that is, the orientation of the sun with respect to the one surface 20a of the base member 20 configuring the daylighting member 40 is $\phi$, and a distance between the daylighting members 40 is l, $l=w+w \sin \phi \tan \phi$ is satisfied.

In the daylighting device 300 of the embodiment, as illustrated in FIG. 10B, the distance l between the daylighting members 40 configuring the composite member 220 is a distance between the movable units 50 forming the central axis of the daylighting member 40.

According to the daylighting device 300 of the embodiment, since the width w of the daylighting member 40 configuring the composite member 220, the orientation $\phi$ of the sun with respect to the daylighting member 40, and the distance l between the daylighting members 40 satisfy $l=w+w \sin \phi \tan \phi$, in a case where the composite member 220 is moved such that the one surface 20a of the base member 20 configuring the daylighting member 40 turns toward the orientation of the sun, it is reduced that the sunlight incident on the window glass 100 passes between the daylighting members 40.

As illustrated in FIG. 11A, when a plurality of the composite members 220 are disposed continuously with each other without any gap and the composite members 220 of the daylighting device 300 are disposed (in parallel) such that the one surfaces 20a of the base members 20 face the one surface 100a of the window glass 100, in a case where the orientation of the sun and the one surfaces 20a of the base members 20 directly face each other, the sunlight incident on the window glass 100 does not pass between the daylighting members 40. As a result, all the sunlight incident on a region (upper part of the window glass 100 (region of indoor ceiling side)) facing the daylighting members 40 of the window glass 100 is incident on the daylighting members 40 configuring the composite members 220.

In the case, the sunlight incident on the window glass 100 does not pass between the shielding members 210 configuring the composite members 220. As a result, all the sunlight incident on a region (lower part of the window glass 100 (region of indoor floor side)) facing the shielding members 210 of the window glass 100 is shielded by the shielding members 210 configuring the composite members 220.

On the other hand, as illustrated in FIG. 11B, in the state where the width w of the daylighting member 40 configuring the composite member 220, the orientation φ of the sun with respect to the daylighting member 40, and the distance l between the daylighting members 40 satisfy l=w+w sin φ tan φ, in a case where the composite members 220 (the daylighting members 40) are disposed obliquely with respect to the one surface 100a of the window glass 100 by moving the composite members 220 of the daylighting device 300 such that the one surfaces 20a of the base members 20 face (directly face the sun) the orientation of the sun, the plurality of the composite members 220 are disposed without any gap with respect to the sunlight incident on the window glass 100.

Thereby, the sunlight incident on the window glass 100 does not pass between the daylighting members 40. As result, all the sunlight incident on the region (upper part of the window glass 100 (region of indoor ceiling side)) facing the daylighting members 40 of the window glass 100 is incident on the daylighting members 40 configuring the composite members 220.

In the case, the sunlight incident on the window glass 100 does not pass between the shielding members 210 configuring the composite members 220. As a result, all the sunlight incident on the region (lower part of the window glass 100 (region of indoor floor side)) facing the shielding members 210 of the window glass 100 is shielded by the shielding members 210 configuring the composite members 220.

As illustrated in FIGS. 12A and 12B, when the distance between the daylighting members 40 in the case where the daylighting members 40 (composite members 220) are disposed in parallel to the one surface 100a of the window glass 100 is $l_1$ and a distance between the daylighting members 40 in the case where the daylighting members 40 are disposed obliquely with respect to the one surface 100a of the window glass 100 is $l_2$, it is preferable to satisfy $l_1 < l_2$. That is, the distance $l_1$ between the daylighting members 40 in the case where the daylighting members 40 (composite members 220) are disposed in parallel to the one surface 100a of the window glass 100 is a length in the case where the adjacent daylighting members 40 are disposed such that a part of edges of the daylighting members along the longitudinal direction thereof overlaps each other. The distance l2 between the daylighting members 40 in the case where the daylighting members 40 are disposed obliquely with respect to the one surface 100a of the window glass 100 is a length in the case where the adjacent daylighting members 40 are disposed such that a part of edges of the daylighting members along the longitudinal direction thereof does not overlap each other.

That is, it is preferable that the distance between the daylighting members 40 in the states of FIGS. 11A and 12A is $l_1$, and the distance between the daylighting members 40 in the states of FIGS. 11B and 12B is $l_2$. Thereby, when the daylighting member 40 is moved and disposed obliquely with respect to the one surface 100a of the window glass 100, there is no hindrance of the rotation of each daylighting member 40 due to interference between the daylighting members 40.

Fourth Embodiment (Daylighting Device)

Figure 13A:
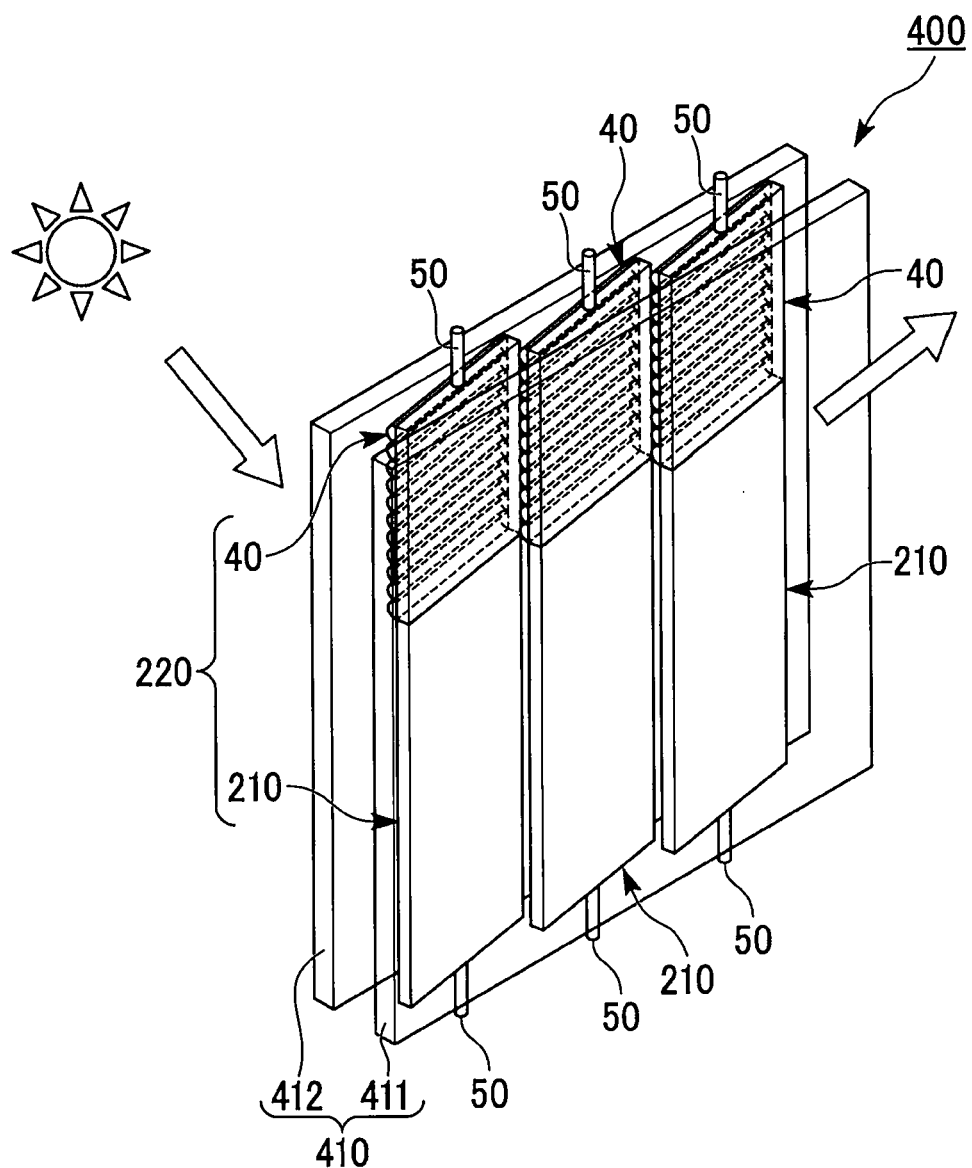
FIG. 13A is a perspective view illustrating a schematic configuration of a daylighting device according to a fourth embodiment of the present invention.
Figure 13B:
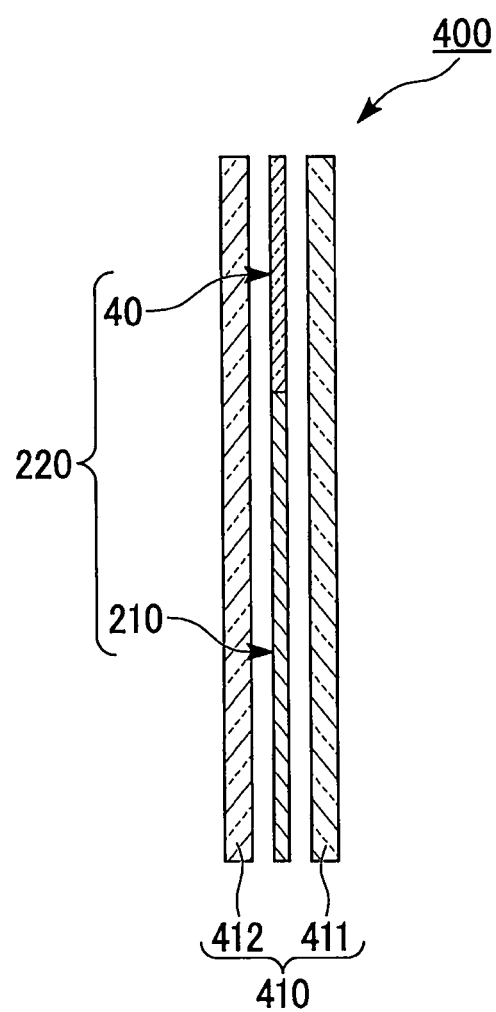
FIG. 13B is a sectional view illustrating the schematic configuration of the daylighting device according to the fourth embodiment of the present invention.

FIGS. 13A and 13B illustrate schematic configurations of a daylighting device according to a fourth embodiment of the present invention. FIG. 13A is a perspective view, and FIG. 13B is a sectional view. In FIGS. 13A and 13B, the same reference sign is assigned to the same component as the daylighting device of the first embodiment illustrated in FIGS. 1 and 2, the daylighting device of the second embodiment illustrated in FIGS. 6A, 6B, and 7, and the description thereof is omitted.

The daylighting device 400 of the embodiment includes the shielding member 210 hanging down from each of the daylighting members 40 configuring the daylighting device 10 of the first embodiment described above, and the composite member 220 configured to have the daylighting member 40 and the shielding member 210 is installed inside double-layered glass 410.

In the embodiment, the double-layered glass 410 is formed by disposing a pair of glass plates 411 and 412 facing each other with a space therebetween through a spacer (not illustrated). Hereinafter, the glass plate 411 disposed on the indoor side is referred to as a first glass plate 411, and the glass plate 412 disposed on the outdoor side is referred to as a second glass plate 412.

In the daylighting device 400 of the embodiment, the composite member 220 is disposed inside the double-layered glass 410, that is, between the first glass plate 411 and the second glass plate 412.

It is preferable that a distance between the first glass plate 411 and the second glass plate 412 is larger than the width of the daylighting member 40, that is, the length in the direction perpendicular to the longitudinal direction of the daylighting member 40. Thereby, it is possible to dispose the composite member 220 (daylighting member 40) obliquely with respect to the one surface 100a of the window glass 100 described above by moving the composite member 220 even inside the double-layered glass 410.

According to the daylighting device 400 of the embodiment, since the composite member 220 configured to have the daylighting member 40 and the shielding member 210 is installed inside the double-layered glass 410, it is possible to prevent the daylighting member 40 and the shielding member 210 from being deformed or degraded due to external influences. Thereby, the daylighting member 40 and the shielding member 210 can exert the effect stably over a long time of period. When the composite member 220 is integrated with the double-layered glass 410, a space for installing the daylighting device 400 is not necessary. The appearance of the window does not change with the installation of the daylighting device 400.

In the embodiment, the case that the composite member 220 configured to have the daylighting member 40 and the shielding member 210 is installed inside the double-layered glass 410 is exemplified, but the embodiment is not limited thereto. In the embodiment, the composite member 220 configured to have the daylighting member 40 and the shielding member 210 may be installed inside multi-layered glass. That is, the composite member 220 configured to have the daylighting member 40 and the shielding member 210 may be installed at least one place between a pair of glass plates configuring the multi-layered glass.

Fifth Embodiment (Daylighting Device)

Figure 14A:
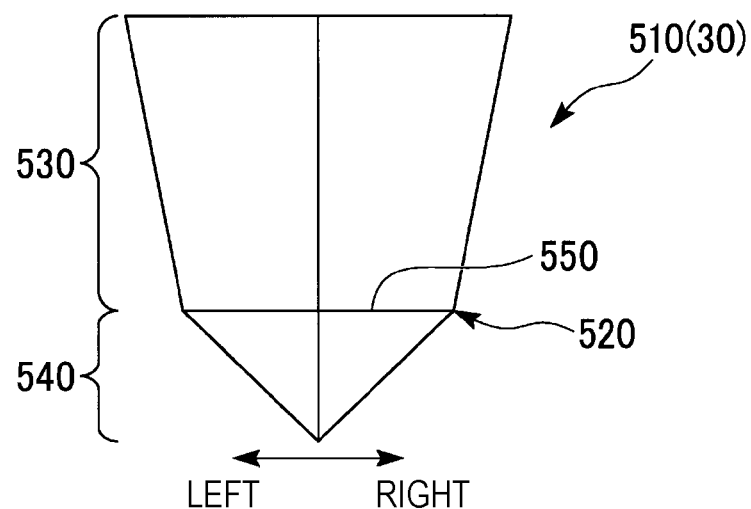
FIG. 14A is a top view illustrating a schematic configuration of a daylighting unit of a daylighting member configuring a daylighting device according to a fifth embodiment of the present invention.
Figure 14B:
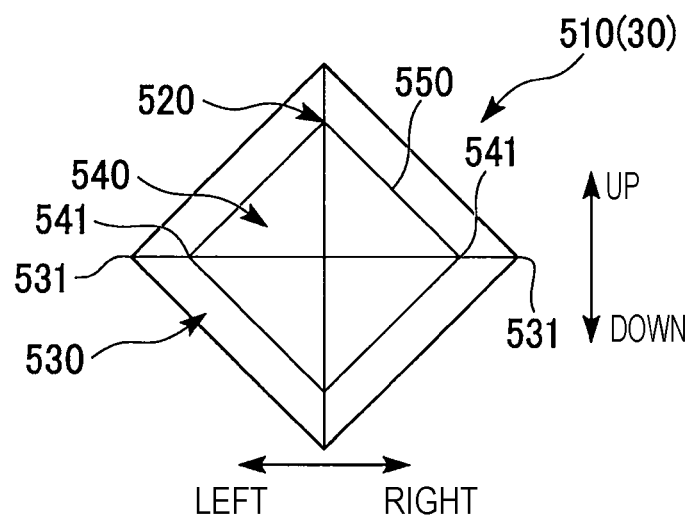
FIG. 14B is a front view illustrating the schematic configuration of the daylighting unit of the daylighting member configuring the daylighting device according to the fifth embodiment of the present invention.
Figure 14C:
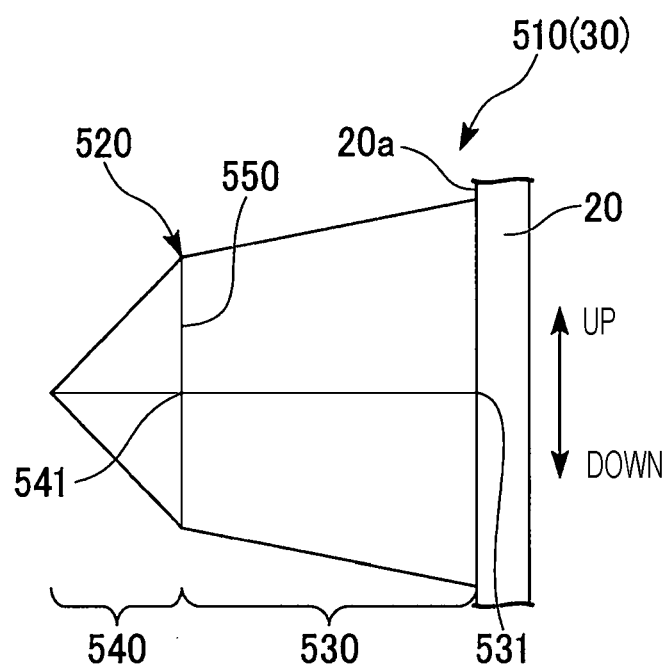
FIG. 14C is a side view illustrating the schematic configuration of the daylighting unit of the daylighting member configuring the daylighting device according to the fifth embodiment of the present invention.
Figure 14D:
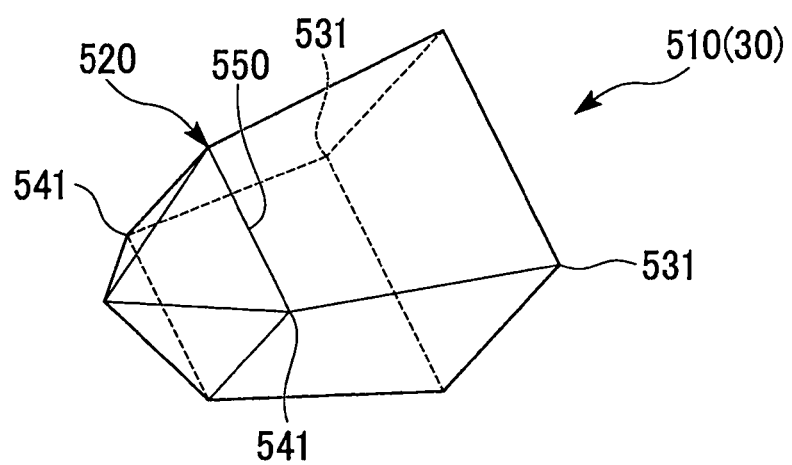
FIG. 14D is a perspective view illustrating the schematic configuration of the daylighting unit of the daylighting member configuring the daylighting device according to the fifth embodiment of the present invention.

FIGS. 14A to 14D illustrate schematic configurations of a daylighting unit of a daylighting member configuring a daylighting device according to a fifth embodiment of the present invention. FIG. 14A is a top view, FIG. 14B is a front view, FIG. 14C is a side view, and FIG. 14D is a perspective view. In FIGS. 14A to 14D, the same reference sign is assigned to the same component as the daylighting device of the first embodiment illustrated in FIGS. 1 and 2, and the description thereof is omitted.

In the daylighting device of the embodiment, the daylighting unit 30 of the daylighting member 40 is configured to have a plurality of quadrangular pyramid-shaped structures 510, and the plurality of quadrangular pyramid-shaped structures 510 are disposed continuously on the one surface 20a of the base member 20 such that the plurality of the quadrangular pyramid-shaped structures 510 extend in the direction perpendicular to the vertical direction of the window glass 100 described above in which the daylighting device is installed, that is, the direction perpendicular to the longitudinal direction of the base member 20 described above.

The structure 510 has one change point 520 in which a shape of the structure is changed. The structure 510 is configured to have a first structure 530 and a second structure 540 in order from the one surface 20a of the base member 20, and the change point 520 exists on a boundary line (tangent line) 550 in which the first structure 530 and the second structure 540 are connected.

The first structure 530 has a shape in which a part near the apex of a square pyramid is cut in a direction perpendicular to the height direction of the square pyramid. The second structure 540 forms a square pyramid with the upper surface (surface opposite to a surface in contact with the one surface 20a of the base member 20) of the first structure 530 as the base surface.

As illustrated in FIG. 14B, a straight line passing through diagonal vertexes 531 and 531 of a square forming the base surface of the first structure 530 and a straight line passing through diagonal vertexes 541 and 541 of a square forming the base surface of the second structure 540 are disposed in the direction perpendicular to the longitudinal direction (the up and down direction) of the base member 20 on the one surface 20a of the base member 20.

It is preferable that the structures 510 are disposed most densely on the one surface 20a of the base member 20. When the structures 510 are disposed most densely, the sunlight incident on the window glass 100 is not incident indoors with transmitting only the base member 20 and without transmitting the daylighting unit 30. Thereby, it is possible to effectively output the sunlight indoors by the daylighting member 40.

According to the daylighting device of the embodiment, since the daylighting unit 30 of the daylighting member 40 is configured to have the plurality of the quadrangular pyramid-shaped structures 510, when the sunlight transmitted through the window glass 100 is incident on the structure 510, the sunlight is reflected inside the structure 510, and the reflected sunlight is output toward one end (upper end) side of the base member 20, that is, the indoor ceiling side from the base member 20.

In the embodiment, the case that the structure 510 has one change point 520 in which the shape of the structure is changed is exemplified, but the present invention is not limited thereto. In the embodiment, the structure configuring the daylighting unit may have two or more change points in which the shape of the structure is changed.

Sixth Embodiment (Daylighting Device)

Figure 15A:
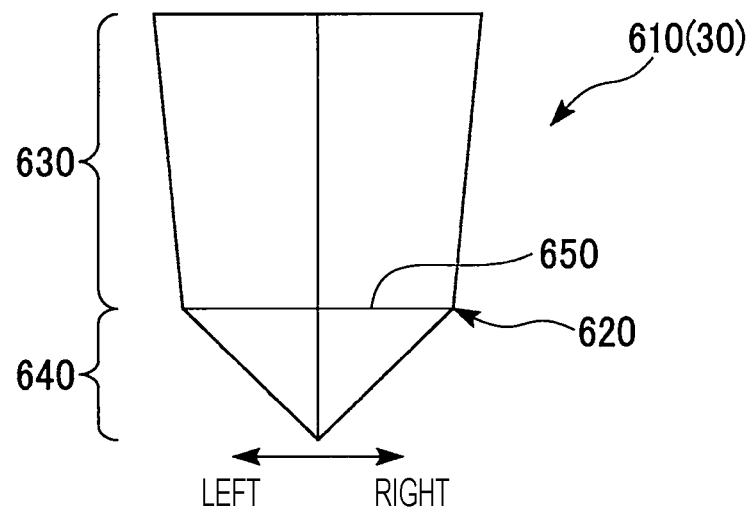
FIG. 15A is a top view illustrating a schematic configuration of a daylighting unit of a daylighting member configuring a daylighting device according to a sixth embodiment of the present invention.
Figure 15B:
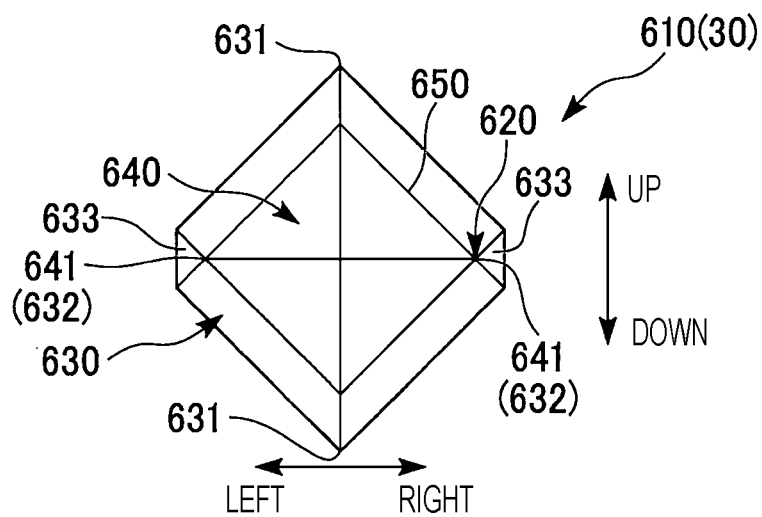
FIG. 15B is a front view illustrating the schematic configuration of the daylighting unit of the daylighting member configuring the daylighting device according to the sixth embodiment of the present invention.
Figure 15C:
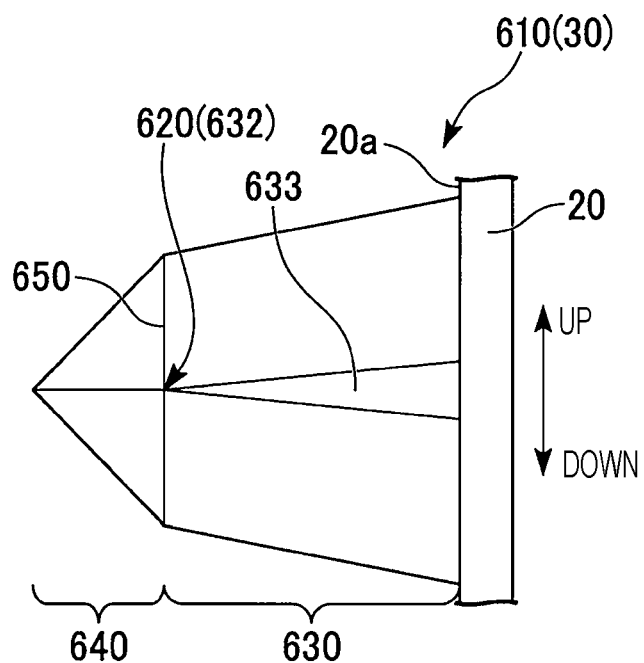
FIG. 15C is a side view illustrating the schematic configuration of the daylighting unit of the daylighting member configuring the daylighting device according to the sixth embodiment of the present invention.
Figure 15D:
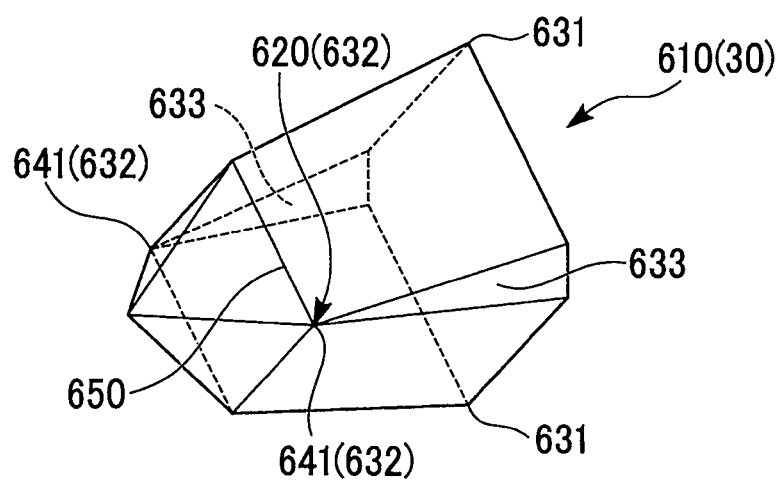
FIG. 15D is a perspective view illustrating the schematic configuration of the daylighting unit of the daylighting member configuring the daylighting device according to the sixth embodiment of the present invention.

FIGS. 15A to 15D illustrate schematic configurations of a daylighting unit of a daylighting member configuring a daylighting device according to a sixth embodiment of the present invention. FIG. 15A is a top view, FIG. 15B is a front view, FIG. 15C is a side view, and FIG. 15D is a perspective view.

In FIGS. 15A to 15D, the same reference sign is assigned to the same component as the daylighting device of the first embodiment illustrated in FIGS. 1 and 2, and the description thereof is omitted.

In the daylighting device of the embodiment, the daylighting unit 30 of the daylighting member 40 is configured to have a plurality of quadrangular pyramid-shaped structures 610, and the plurality of quadrangular pyramid-shaped structures 610 are disposed continuously on the one surface 20a of the base member 20 such that the plurality of the quadrangular pyramid-shaped structures 610 extend in the direction perpendicular to the vertical direction of the window glass 100 described above in which the daylighting device is installed, that is, the direction perpendicular to the longitudinal direction of the base member 20 described above.

The structure 610 has one change point 620 in which a shape of the structure is changed. The structure 610 is configured to have a first structure 630 and a second structure 640 in order from the one surface 20a of the base member 20, and the change point 620 exists on a boundary line (tangent line) 650 in which the first structure 630 and the second structure 640 are connected.

The first structure 630 has a shape in which a part near the apex of a square pyramid is cut in a direction perpendicular to the height direction of the square pyramid. The first structure 630 includes isosceles triangle-shaped side surfaces 633 and 633 formed by cutting obliquely from diagonal vertexes 632 and 632 of a square forming the upper surface (surface opposite to a surface in contact with the one surface 20a of the base member 20) of the first structure 630 toward the base surface of the first structure 630. Thereby, as illustrated in FIG. 15B, the base surface of the first structure 630 forms a hexagonal shape. The second structure 640 forms a square pyramid with the upper surface (surface opposite to a surface in contact with the one surface 20a of the base member 20) of the first structure 630 as the base surface.

As illustrated in FIG. 15B, a straight line passing through diagonal vertexes 631 and 631 of a square forming the base surface of the first structure 630 is disposed in the direction perpendicular to the longitudinal direction of the base member 20 on the one surface 20a of the base member 20. A straight line passing through diagonal vertexes 641 and 641 of a square forming the base surface of the second structure 640 is disposed in the direction perpendicular to the longitudinal direction (the up and down direction) of the base member 20 on the one surface 20a of the base member 20.

It is preferable that the structures 610 are disposed most densely on the one surface 20a of the base member 20. When the structures 610 are disposed most densely, the sunlight incident on the window glass 100 is not incident indoors with transmitting only the base member 20 and without transmitting the daylighting unit 30. Thereby, it is possible to effectively output the sunlight indoors by the daylighting member 40.

According to the daylighting device of the embodiment, since the daylighting unit 30 of the daylighting member 40 is configured to have the plurality of the quadrangular pyramid-shaped structures 610, when the sunlight transmitted through the window glass 100 is incident on the structure 610, the sunlight is reflected inside the structure 610, and the reflected sunlight is output toward one end (upper end) side of the base member 20, that is, the indoor ceiling side from the base member 20.

In the embodiment, the case that the structure 610 has one change point 620 in which the shape of the structure is changed is exemplified, but the present invention is not limited thereto. In the embodiment, the structure configuring the daylighting unit may have two or more change points in which the shape of the structure is changed.

[Daylighting System]

Figure 16:
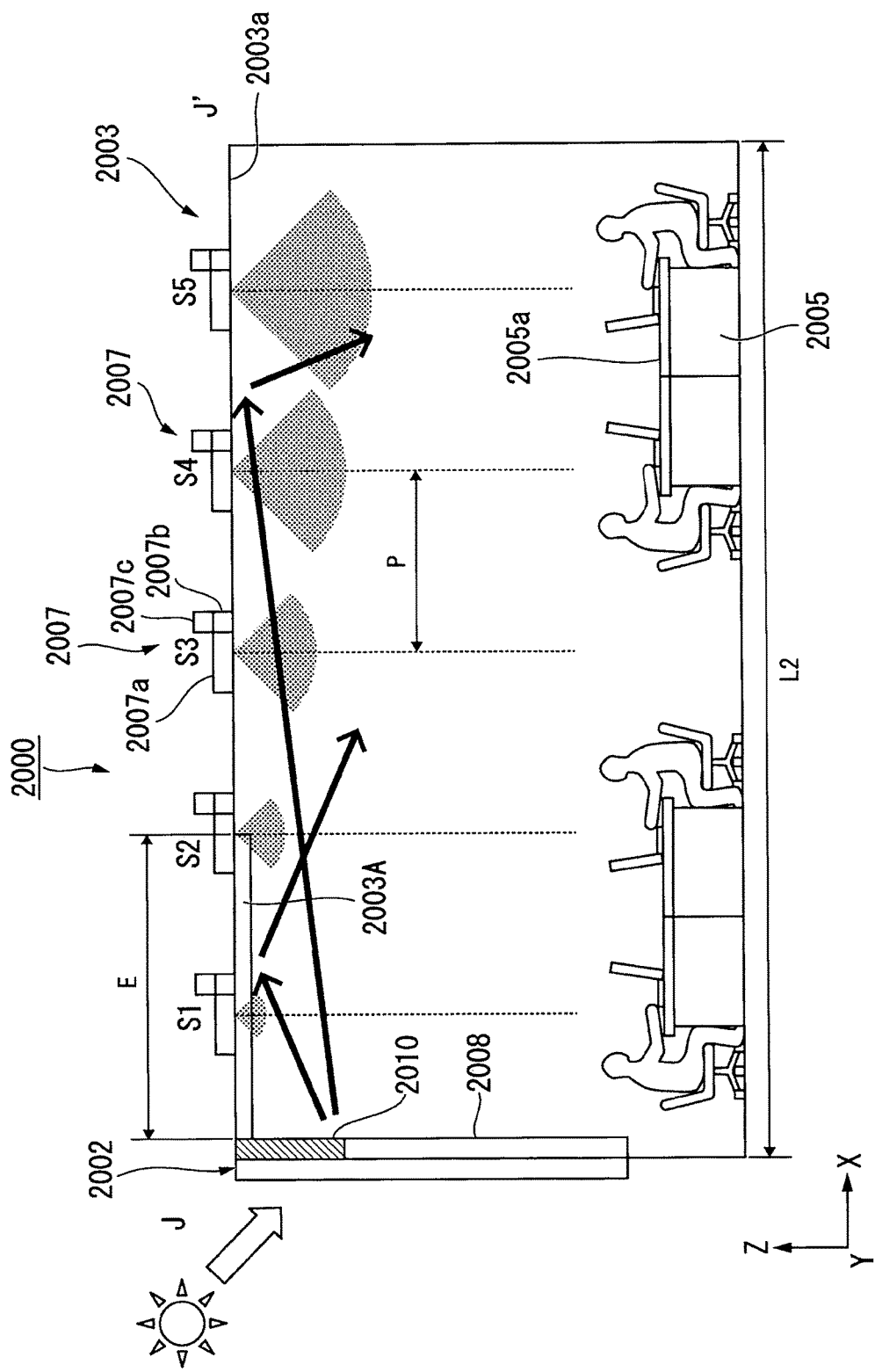
FIG. 16 is a diagram illustrating a room model including a daylighting device and a lighting control system and a sectional view taken along line J-J' of FIG. 17.
Figure 17:
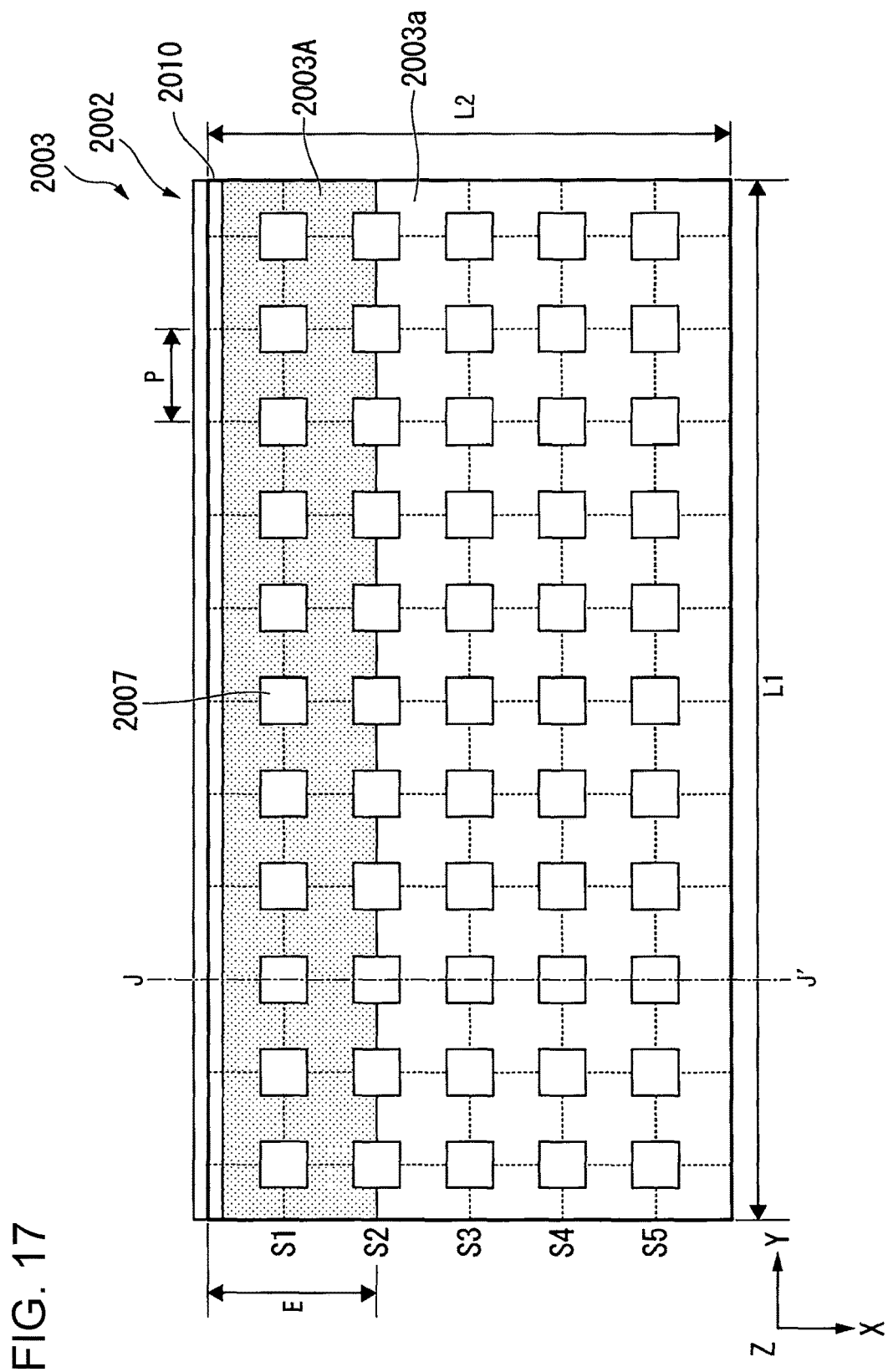
FIG. 17 is a plan view illustrating a ceiling of the room model.

FIG. 16 is a diagram illustrating a room model 2000 including a daylighting device and a lighting control system and a sectional view taken along line J-J' of FIG. 17. FIG. 17 is a plan view illustrating a ceiling of the room model 2000.

In the room model 2000, a ceiling material configuring a ceiling 2003a of the room 2003 in which external light is introduced may have high light reflectivity. As illustrated in FIGS. 16 and 17, a light reflective ceiling material 2003A is installed in the ceiling 2003a of the room 2003 as the ceiling material having the light reflectivity. The light reflective ceiling material 2003A is intended to promote the introduction of the external light from a daylighting device 2010 installed in a window 2002 to the inner side of the room and is installed in the ceiling 2003a of the window side. Specifically, the ceiling material is installed in a predetermined region E (region of about 3 m from window 2002) of the ceiling 2003a.

The light reflective ceiling material 2003A, as described above, efficiently guides the external light introduced into the room through the window 2002 in which the daylighting device 2010 (daylighting device of any one of embodiments described above) is installed to the inner side of the room. The external light introduced toward the indoor ceiling 2003a from the daylighting device 2010 is reflected by the light reflective ceiling material 2003A, and the reflected light illuminates a desk surface 2005a of a desk 2005 placed inner side of the room by changing a direction thereof, thereby exerting the effect of brightening the desk surface 2005a.

The light reflective ceiling material 2003A may be a diffuse reflective material or may be a specular reflective material, but it is preferable that characteristics of both are mixed appropriately in order to satisfy both of the effects of brightening the desk surface 2005a of a desk 2005 placed side of the room and the effect of suppressing unpleasant glare rays for a person in the room.

As described above, most of the light introduced by the daylighting device 2010 is directed to the ceiling near the window 2002, but in some cases, the amount of light is sufficient near the window 2002. Accordingly, it is possible to distribute the light incident on the ceiling (region E) near the window into the inner side of the room in which the amount of light is less than the window side by using the light reflective ceiling material 2003A together as described above.

The light reflective ceiling material 2003A can be formed, for example, by performing a embossing process with roughness of about several tens of microns on a metal plate such as aluminum or depositing a metal film such as aluminum on a surface of a resin substrate in which similar roughness is formed. Alternatively, the roughness formed by the embossing process may be formed with a curved surface having a longer period.

Further, it is possible to control the light distribution characteristics or the distribution of light in the room by appropriately changing the emboss shape formed in the light reflective ceiling material 2003A. For example, in a case where the embossing process is performed in a stripe shape extending toward the inner side of the room, the light reflected by the light reflective ceiling material 2003A expands in the left and right direction (direction crossing the longitudinal direction of the roughness) of the window 2002. In a case where a size or a direction of the window 2002 in the room 2003 is limited, it is possible to diffuse the light the horizontal direction and reflect the light toward the inner side of the room with the light reflective ceiling material 2003A by utilizing such property.

The daylighting device 2010 is used as a part of the lighting control system of the room 2003. The lighting control system is configured to have component members of the entire room including the daylighting device 2010, a plurality of indoor lighting devices 2007, a solar radiation adjustment device 2008 installed in the window, a control system of those devices, and the light reflective ceiling material 2003A installed in the ceiling 2003a.

In the window 2002 of the room 2003, the daylighting device 2010 is installed on the upper side, and the solar radiation adjustment device 2008 is installed in the lower side. Here, blinds are installed as the solar radiation adjustment device 2008, but the device is not limited thereto.

In the room 2003, the plurality of indoor lighting devices 2007 are arranged in a lattice shape in the left and right direction (Y direction) of the window 2002 and in the depth direction (X direction) of the room. The plurality of indoor lighting devices 2007 configures the entire lighting system of the room 2003 together with the daylighting device 2010.

For example, FIGS. 16 and 17 illustrate the ceiling 2003a of an office in which a length $L_1$ of the left and right direction (Y direction) of the window 2002 is 18 m, and a length $L_2$ of the depth direction (X direction) of the room 2003 is 9 m. Here, the indoor lighting devices 2007 are arranged in a lattice shape with a distance P of 1.8 m in the lateral direction (Y direction) and in the depth direction (X direction) of the ceiling 2003a, respectively. Specifically, fifty indoor lighting devices 2007 are arranged in 11 rows (Y direction)×5 columns (X direction).

The indoor lighting device 2007 includes an indoor lighting fixture 2007a, a brightness measuring unit 2007b, and a control unit 2007c and is configured that the brightness measuring unit 2007b and the control unit 2007c are integrated in the indoor lighting fixture 2007a.

The indoor lighting device 2007 may have a plurality of the indoor lighting fixtures 2007a and a plurality of the brightness measuring units 2007b. However, one brightness measuring unit 2007b is disposed for each indoor lighting fixture 2007a. The brightness measuring unit 2007b receives reflected light of an irradiated surface on which the indoor lighting fixture 2007a illuminates and measures illuminance of the irradiated surface. Here, the brightness measuring unit 2007b measures the illuminance of the desk surface 2005a of the desk 2005 placed in the room.

The control units 2007c each of which is disposed respectively in each indoor lighting device 2007 are connected to each other. Each indoor lighting device 2007 performs feedback control for adjusting optical output of an LED lamp of each indoor lighting fixture 2007a such that the illuminance of the desk surface 2005a measured by each brightness measuring unit 2007b becomes a constant target illuminance L0 (for example, average illuminance: 750 lx) by the control unit 2007c connected to each other.

According to the daylighting system of the embodiment, it is possible to obtain the constant illuminance irrespective of time and a position of the room 2003 and satisfy both comfortable environment and efficient energy saving by interworking between the daylighting from the daylighting device 2010 varying with the sunlight and the indoor lighting device 2007.

INDUSTRIAL APPLICABILITY

Several aspects of the present invention can be employed in window glass.

REFERENCE SIGNS LIST

10, 200, 300, 400 daylighting device
100 window glass
20 base member
30 daylighting unit
40 daylighting member
50 movable unit
60 support frame
61 light-transmitting unit
210 shielding member
220 composite member
410 double-layered glass
411, 412 glass plate
510 structure
520 change point
530 first structure
531 vertex
540 second structure
541 vertex
610 structure
620 change point
630 first structure
631 vertex
632 vertex
633 side surface
640 second structure
641 vertex

The invention claimed is:

1. A daylighting device installed to face window glass, the daylighting device comprising:
   at least one daylighting member including
      a light-transmissive base member, and
      a plurality of light-transmissive daylighting units disposed adjacent to each other in at least one surface of the light-transmissive base member,
   at least one shielding member hanging down from the at least one daylighting member; and
   a movable unit that moves such that the at least one surface follows a movement of the sun to turn toward an orientation of the sun,
   wherein the at least one daylighting member has a first stripe shape along a first direction which is a vertical direction of the window glass, and
   the at least one shielding member has a second stripe shape along the first direction,
   wherein the at least one daylighting member is a plurality of daylighting members, and
   the plurality of daylighting members is disposed continuously in a second direction perpendicular to the first direction,
   wherein in a case in which a width of one of the plurality of daylighting members is w, an orientation of the sun with respect to the one of the plurality of daylighting members is $\phi$, and a first distance between the plurality of daylighting members is l, $l = w + w \sin \phi \tan \phi$ is satisfied.

2. The daylighting device according to claim 1,
   wherein in a case in which a second distance between the plurality of daylighting members in a case where the plurality of daylighting members is disposed in parallel to the window glass is $l_1$ and a third distance between the plurality of daylighting members in a case where the plurality of daylighting members is disposed obliquely with respect to the window glass is $l_2$, $l_1 < l_2$ is satisfied.

* * * * *